(12) United States Patent
Bennett et al.

(10) Patent No.: US 11,507,986 B2
(45) Date of Patent: Nov. 22, 2022

(54) REVIEW RECORDATION AND EVALUATION SYSTEMS AND METHODS

(71) Applicant: REVUIE LIMITED, Worcestershire (GB)

(72) Inventors: John Richard Bennett, Worcestershire (GB); Andrew William Smith, Worcestershire (GB); Steve Clifford Bennett, Worcestershire (GB)

(73) Assignee: REVUIE LIMITED, Worcestershire (GB)

( * ) Notice: Subject to any disclaimer, the term of this patent is extended or adjusted under 35 U.S.C. 154(b) by 0 days.

(21) Appl. No.: 17/071,272

(22) Filed: Oct. 15, 2020

(65) Prior Publication Data

US 2021/0118021 A1   Apr. 22, 2021

Related U.S. Application Data

(60) Provisional application No. 62/916,893, filed on Oct. 18, 2019.

(51) Int. Cl.
*G06Q 30/02*   (2012.01)
*H04W 4/021*   (2018.01)
*H04W 4/029*   (2018.01)

(52) U.S. Cl.
CPC ..... *G06Q 30/0282* (2013.01); *G06Q 30/0281* (2013.01); *H04W 4/021* (2013.01); *H04W 4/029* (2018.02)

(58) Field of Classification Search
CPC .......... G06Q 30/0282; G06Q 30/0281; H04W 4/029; H04W 4/021
See application file for complete search history.

(56) References Cited

U.S. PATENT DOCUMENTS

| | | |
|---|---|---|
| 7,010,267 B2 | 3/2006 | Vanluijt et al. |
| 8,473,304 B2 | 6/2013 | Black |
| 8,494,973 B1 | 7/2013 | Dignan et al. |
| 9,785,981 B2 | 10/2017 | Grasso et al. |
| 9,817,907 B1 | 11/2017 | Shrifi |
| 2010/0185552 A1 | 7/2010 | Deluca et al. |
| 2013/0055354 A1 | 2/2013 | Weinberg et al. |
| 2014/0114877 A1 | 4/2014 | Montano |
| 2014/0258169 A1 | 9/2014 | Wong et al. |
| 2014/0259189 A1 | 9/2014 | Ramachandran |
| 2015/0178279 A1* | 6/2015 | Chen .................. G06F 16/9535 707/748 |

(Continued)

OTHER PUBLICATIONS

International Search Report and Written Opinion from PCT Application No. PCT/IB2020/059726 dated Dec. 14, 2020.

(Continued)

*Primary Examiner* — Andrew T Chiusano
(74) *Attorney, Agent, or Firm* — DLA Piper LLP US

(57) ABSTRACT

A computer-implemented system and method for generating and displaying an authority score through a software application executed by a process or a computing device. The processor may receive visit data indicative of a user's presence and review data describing an entity at a location. The processor may determine an authority score for the review data and perform a calculation using at least a portion of the visit data as at least one input. The processor may generate and cause a visual indication of the authority score to be displayed by a display device.

40 Claims, 21 Drawing Sheets

Displaying the Authority Score

(56) References Cited

U.S. PATENT DOCUMENTS

| | | | | |
|---|---|---|---|---|
| 2016/0105435 A1* | 4/2016 | Turner | ................ | H04L 63/0876 |
| | | | | 726/7 |
| 2016/0134633 A1* | 5/2016 | Gaddam | ................ | G06Q 50/01 |
| | | | | 726/4 |
| 2017/0006430 A1* | 1/2017 | Chao | .................. | G06Q 30/0261 |
| 2017/0358015 A1 | 12/2017 | Klein et al. | | |
| 2020/0036761 A1* | 1/2020 | Weinwurm | ........... | H04L 51/046 |
| 2020/0126142 A1* | 4/2020 | Mohsin | .............. | G06Q 30/0641 |

OTHER PUBLICATIONS

Ma, Yingying, and Fengjun Li. "Detecting review spam: Challenges and opportunities." 8th International Conference on Collaborative Computing: Networking, Applications and Worksharing (CollaborateCom). IEEE, 2012.

Luo, Wanying, and Urs Hengartner. "Veriplace: a privacy-aware location proof architecture." Proceedings of the 18th SIGSPATIAL International Conference on Advances in Geographic Information Systems. ACM, 2010.

Saroiu, Stefan, and Alec Wolman. "Enabling new mobile applications with location proofs." Proceedings of the 10th workshop on Mobile Computing Systems and Applications. ACM, 2009.

Lenders, Vincent, et al. "Location-based trust for mobile user-generated content: applications, challenges and implementations." Proceedings of the 9th workshop on Mobile computing systems and applications. ACM, 2008.

European Office Action in Application No. 20797867.1-1203, dated May 25, 2022.

\* cited by examiner

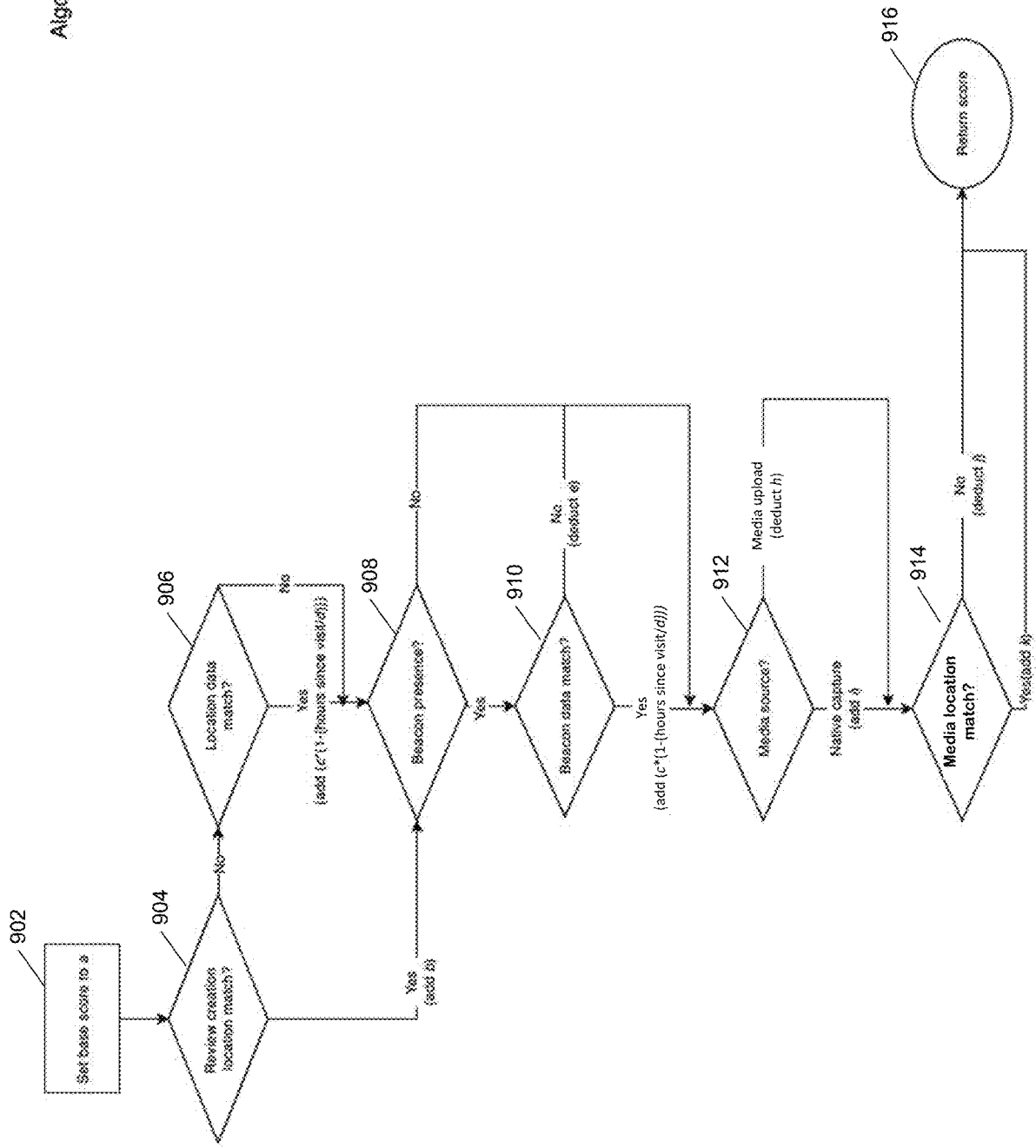

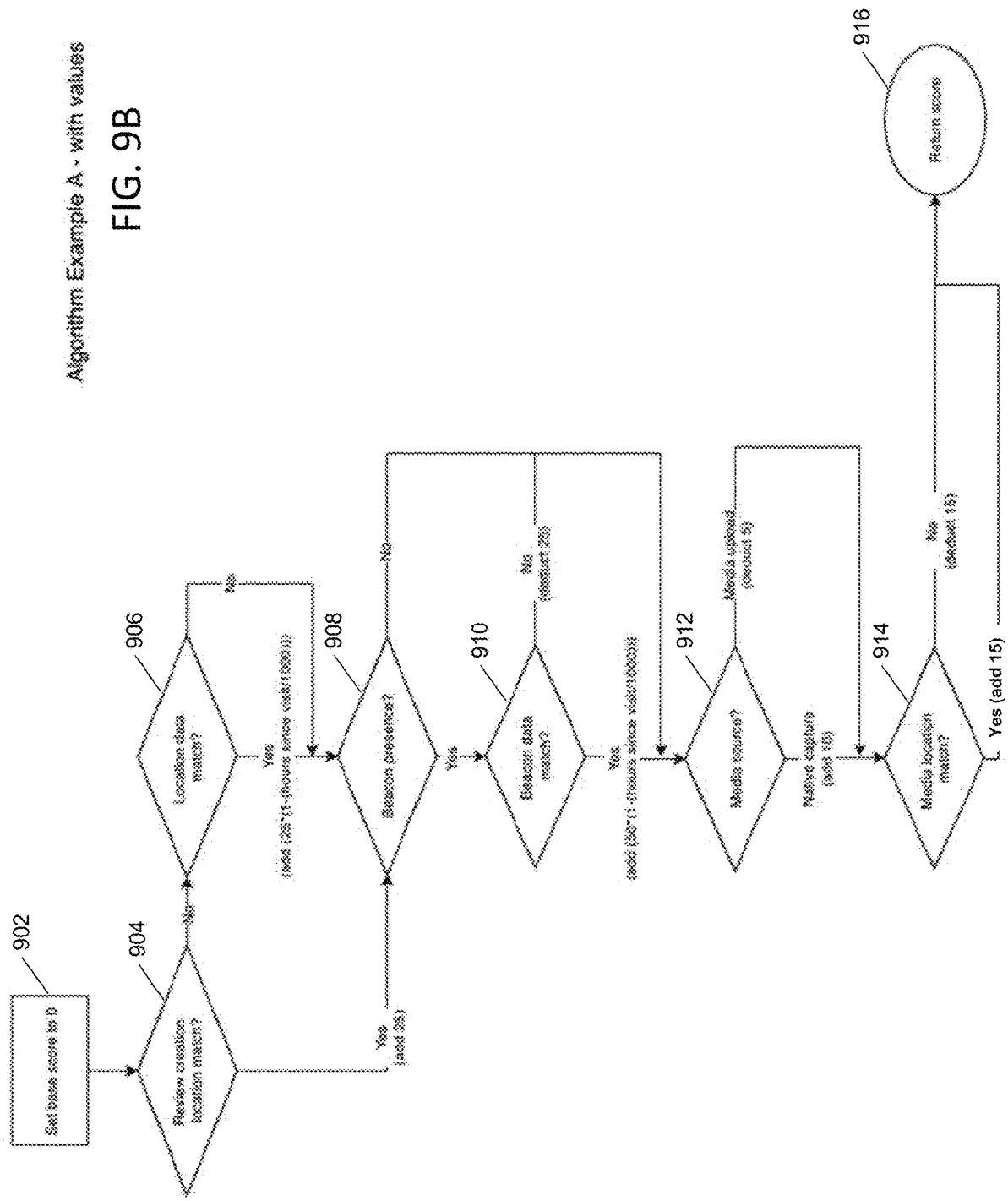

REVIEW RECORDATION AND EVALUATION SYSTEMS AND METHODS

CROSS-REFERENCE TO RELATED APPLICATIONS

This application claims priority from U.S. Provisional Application No. 62/916,893, filed Oct. 18, 2019, and entitled "Review Recordation and Evaluation Systems and Methods", the entire contents of which are herein incorporated by reference.

SUMMARY

In accordance with some embodiments of the present disclosure, there is provided a method for generating and displaying an authority score. The method can include receiving visit data indicative of a user's presence at a location and receiving review data describing an entity at the location by at least one processor. The method can include determining an authority score for the review data by the at least one processor. The determining an authority score for the review data can include performing a calculation using at least a portion of the visit data and/or review data as at least one input by the at least one processor. The method can also include generating a visual indication of the authority score, the visual indication having at least one visual characteristic determined by at least one outcome of the calculation of the at least one processor. The method can further include causing the visual indication to be displayed by a display device, by the at least one processor.

Furthermore, in accordance with some embodiments of the present disclosure, there is provided a system for generating and displaying an authority score. The system can include a display device and at least one processor in communication with the display device. The at least one processor can be configured to receive visit data indicative of a user's presence and receive review data describing an entity at a location. The at least one processor can be configured to determine an authority score for the review data. The determining can include performing a calculation using at least a portion of the visit data and/or review data as at least one input and generating a visual indication of the authority score by the at least one processor. The visual indication can have at least one visual characteristic determined by at least one outcome of the calculation.

Furthermore, in accordance with some embodiments of the present disclosure, there is provided a method for generating and displaying an authority score. The method can include receiving review data describing an entity at the location. The method can include determining an authority score for the review data by the at least one processor. The determining an authority score for the review data can include performing a calculation by the at least one processor. The method can also include generating a visual indication of the authority score. The visual indication can have at least one visual characteristic determined by at least one outcome of the calculation of the at least one processor. The method can further include causing the visual indication to be displayed by a display device by the at least one processor.

Furthermore, in accordance with some embodiments of the present disclosure, there is provided a system for generating and displaying an authority score. The system can include a display device and at least one processor in communication with the display device. The at least one processor can be configured to receive review data describing an entity at the location. The at least one processor can be configured to determine an authority score for the review data. The determining includes performing a calculation and generating a visual indication of the authority score by the at least one processor. The visual indication has at least one visual characteristic determined by at least one outcome of the calculation.

The foregoing and other aspects of embodiments are described in further detail with reference to the accompanying drawings, in which the same elements in different figures are referred to by common reference numerals. The embodiments are illustrated by way of example and should not be construed to limit the present disclosure.

BRIEF DESCRIPTION OF THE DRAWINGS

FIG. 9A is a flowchart illustrating an example process for utilizing an algorithm which emphasises beacon data matches and location data matches and adjusts for recency of visit in accordance with some embodiments disclosed herein.

FIG. 9B is a flowchart corresponding to FIG. 9A with example values in accordance with some embodiments disclosed herein.

DETAILED DESCRIPTION

Embodiments described herein may include a method to generate and display an authority score representing the authority, trustworthiness or reliability of reviews recorded through a computer software application executed by a computing device.

Figure 1A:
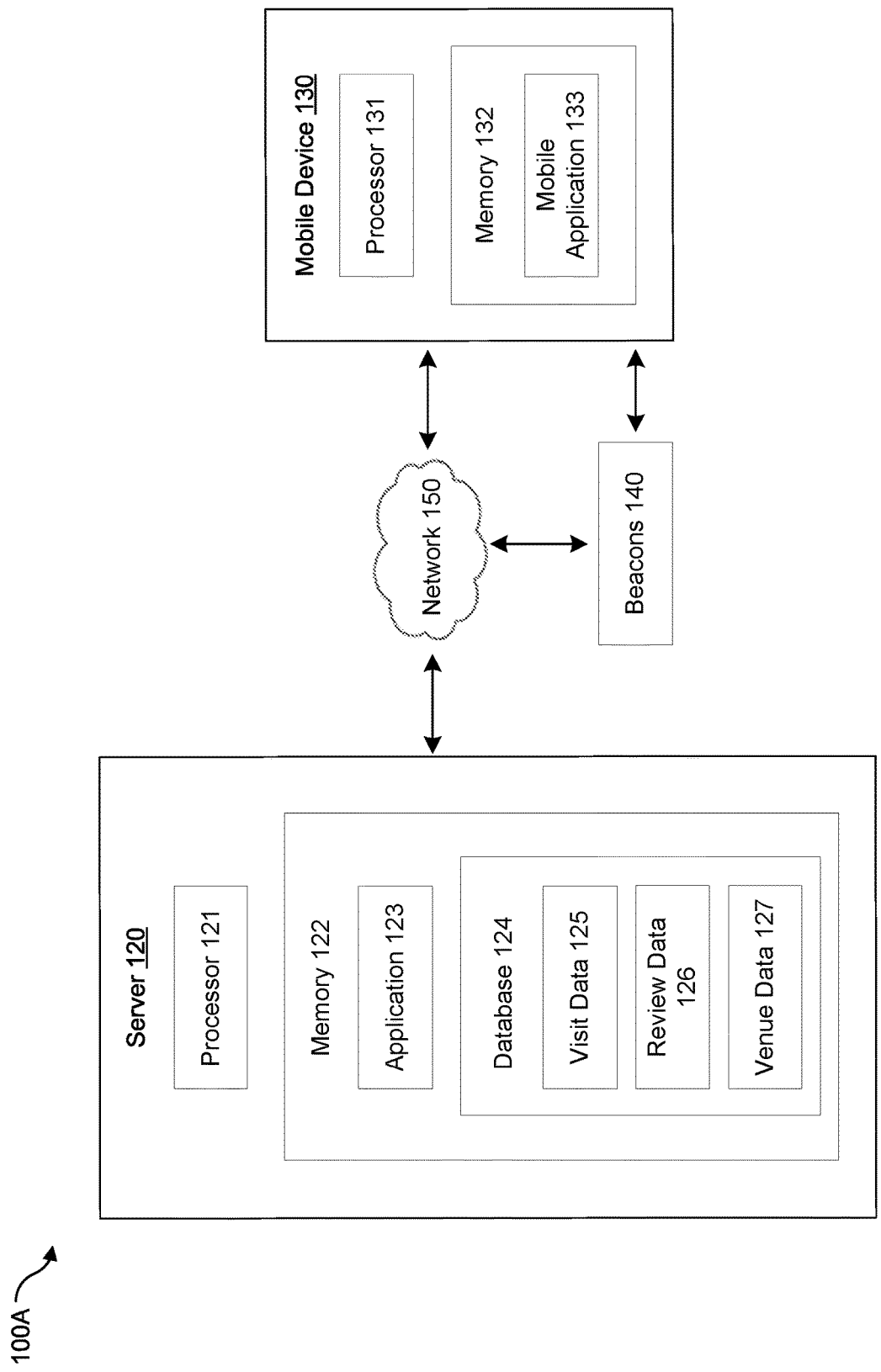
FIG. 1A illustrates an example computing system in accordance with some embodiments of the present disclosure.

FIG. 1A illustrates an example computing system 100A for generating and displaying an authority score of reviews in accordance with the disclosed principles. The computing system 100 may include a server computing device 120 (e.g., a server), one or more user computing devices 130 in communication with the server computing device 120, a plurality of beacons 140 and a network 150. The server computing device 120 may include a processor 121, a memory 122 and a communication interface for enabling communications with other computing devices over network 150. Network 150 may include the Internet and/or other public or private networks or combinations thereof.

The server computing device 120 may host an online service or software application 123 stored in the memory 122. The software application 123 may be configured to include computer-executable instructions for implementing processes, systems and embodiments described in the present disclosure. The computer-executable instructions may be stored in a memory communicatively coupled to and executed by the processor 121 to perform one or more methods for generating an authority score of reviews.

Database 124 may be a database included in or being coupled to the server 120. The database 124 may be a local database in communication with the processor 121 of the server 120 via the network 150. Database 124 may be configured to receive, store and update visit data 125 (e.g., which may include location data, beacon data, and/or other data as described below), review data 126 (e.g., which may include user rating, review text, media data and authority scores of reviews as described below) and venue data 127.

A user computing device 130 may include a processor 131 and a memory 132. The user computing device 130 or a client device may be a mobile computing device, such as a smartphone, tablet, and/or any types of other computing device. In some embodiments, a software application 133 may be a mobile application installed and executed by a processor 131 of a mobile device 130. In some embodiments, a software application 133 may be a web browser application run on the user computing device 130 to access the application 123 on the server 120 for performing operations and processes described herein.

Different processes described herein may be configured as one or more computer programs (e.g., application 123 and/or application 133) executed on the server 120 or user computing devices, in which the systems, processes, and embodiments described below can be implemented. The order of the operations described in each process is not intended to be construed as a limitation, and any number of the described operations can be combined in any order and/or in parallel to implement each process described herein.

Figure 1B:
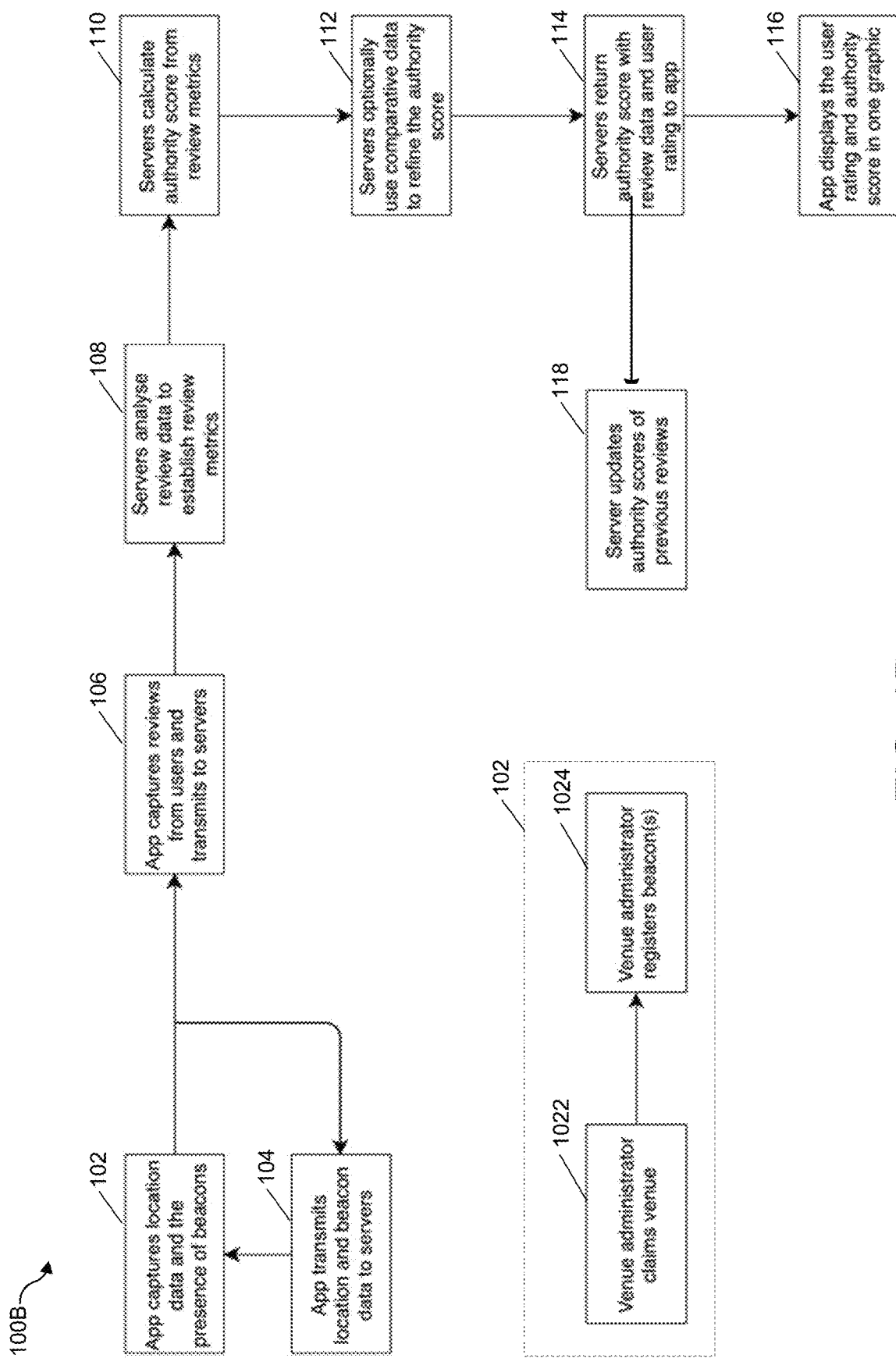
FIG. 1B is a flowchart illustrating an example process for generating and displaying an authority score of reviews through a software application in accordance with some embodiments disclosed herein.
Figure 1C:
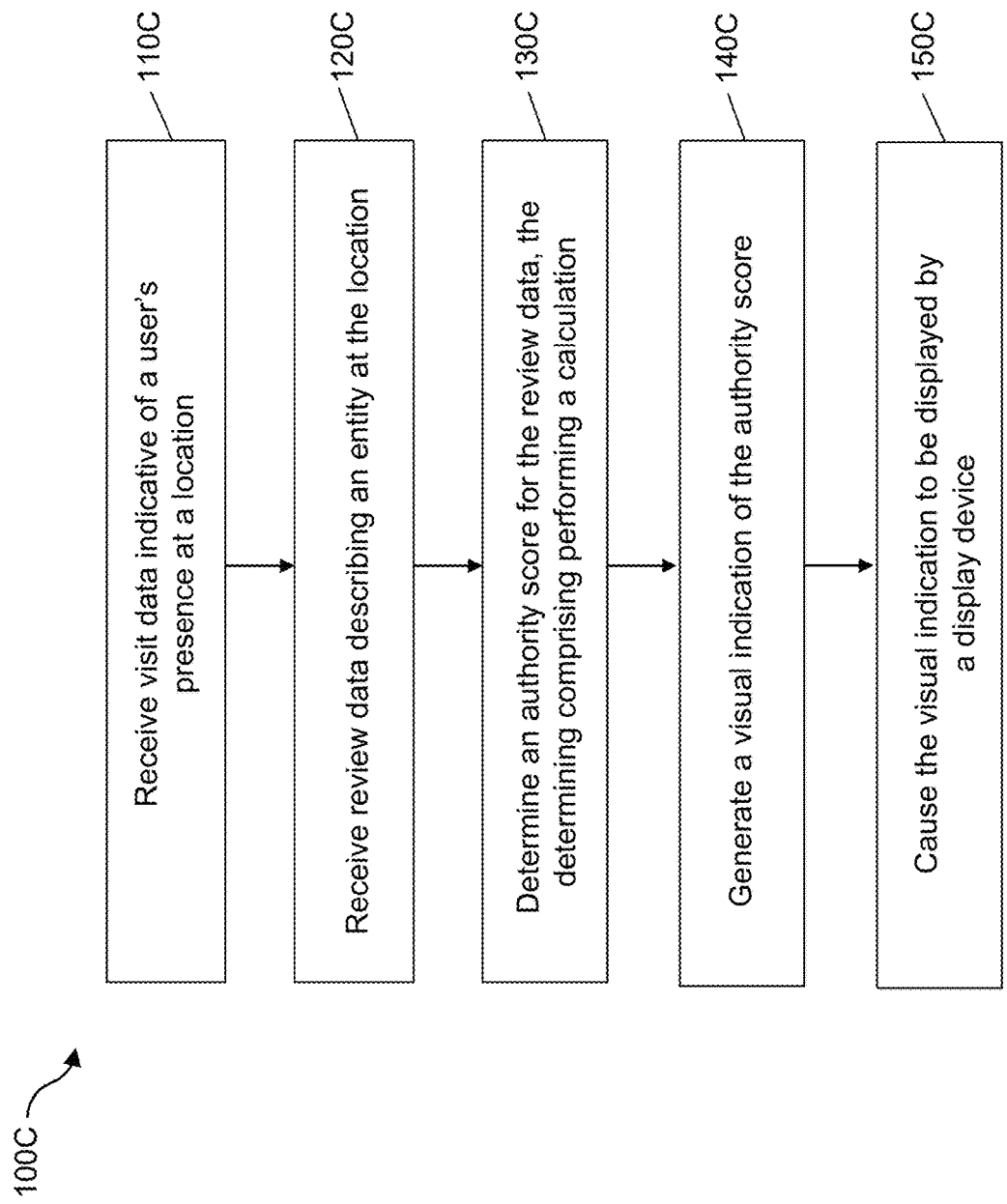
FIG. 1C is a flowchart illustrating another example process for generating and displaying authority score of reviews through a software application in accordance with some embodiments disclosed herein.

FIG. 1B is a flowchart illustrating an example process 100B for generating and displaying an authority score of reviews through a software application.

At 102, the application 133 may capture location data and the presence of beacons ('visit data') (102). At 1022, a venue's administrator may claim a venue (1022) so that the venue administrator registers and configures Bluetooth beacons at their premises (1024). At 104, the application 133 may transmit the location and beacon data to servers 120. At 106, the application 133 may capture reviews from users. At 108, the server may analyse the review data to establish the review metrics. At 110, the server may use the review metrics to calculate and generate an authority score. At 112, the server may optionally use comparative data to refine the authority score. At 114, the server may return the authority score with the user rating to the application. At 116, the application 133 may display the authority score with the user rating in one graphic. At 118, the server may store the generated score in the database 124 to update the authority scores of previous reviews. Optionally, the server 120 may re-evaluate previous authority scores.

The application 133 may record location data and the presence of beacons or other external devices. The location data may include longitude and latitude data. Location data may be periodically captured both when the application 133 is running the foreground and or when it is running in the background. However, the frequency of collection may be dependent on the rate allowed by the operating system, which can differ when the application 133 is in the background.

FIG. 10 is a flowchart illustrating another example process 100C for generating and displaying authority score of reviews through a software application.

At 110C, the processor 121 of the server 120 may receive visit data 125 indicative of a user's presence at a location. The visit data 125 may include an indication of the location, a duration of the user's presence, a time of the user's presence, a record of a previous visit, an activity performed at the location, an indication of a beacon detection by a client device at the location, or a combination thereof. Details about capturing, receiving and recording visit data 125 will be described in FIGS. 2A-2B and FIGS. 4-5 below.

At 120C, the processor 121 of the server 120 may receive review data describing an entity at the location. The review data may include a textual review, a rating score, a media element, or a combination thereof. Details about receiving and transmitting review data will be described in FIGS. 6-8 below.

At 130C, the processor 121 of the server 120 may determine an authority score for the review data. Determining the authority score for the review data may include performing a calculation using at least a portion of the visit data 125 as at least one input. Details about determining an authority score for the review data will be described in FIGS. 9A-9B, 10A-10b, 11A-11B and 12A-12B below.

In one or more embodiments, determining the authority score may include correlating the indication of the location with a record of the location of the entity. In one or more embodiments, determining the authority score may include correlating the beacon detection with a record of the location of the entity. In one or more embodiments, determining the authority score may include determining a location at which the media element was captured and correlating the location at which the media element was captured with a record of the location of the entity.

In one or more embodiments, the calculation may be configured so that the authority score increases with an increase in the duration. In one or more embodiments, the calculation is configured so that the authority score decreases with an increase in a difference between a time at which the visit data 125 is received and the time of the user's presence.

At 140C, the processor 121 of the server 120 may generate a visual indication of the authority score. The visual indication may have at least one visual characteristic determined by at least one outcome of the calculation. The at least one visual characteristic may include a first shaded or colored area and a second shaded or colored area, and the calculation may be configured so that a contrast between the first shaded or colored area and the second shaded or colored area increases as the authority score increases. The at least one visual characteristic may include a first shaded or colored area and a background. In at least some embodiments, the calculation may be configured so that a visibility of the first shaded or colored area against the background increases as the authority score increases. Other modes of displaying the authority score may be employed in other embodiments, as described in detail below.

At 150C, the processor 121 of the server 120 may cause the visual indication to be displayed by a display device. Details about generating and displaying a visual indication of the authority score will be described in FIGS. 13-14 below.

Figure 2A:
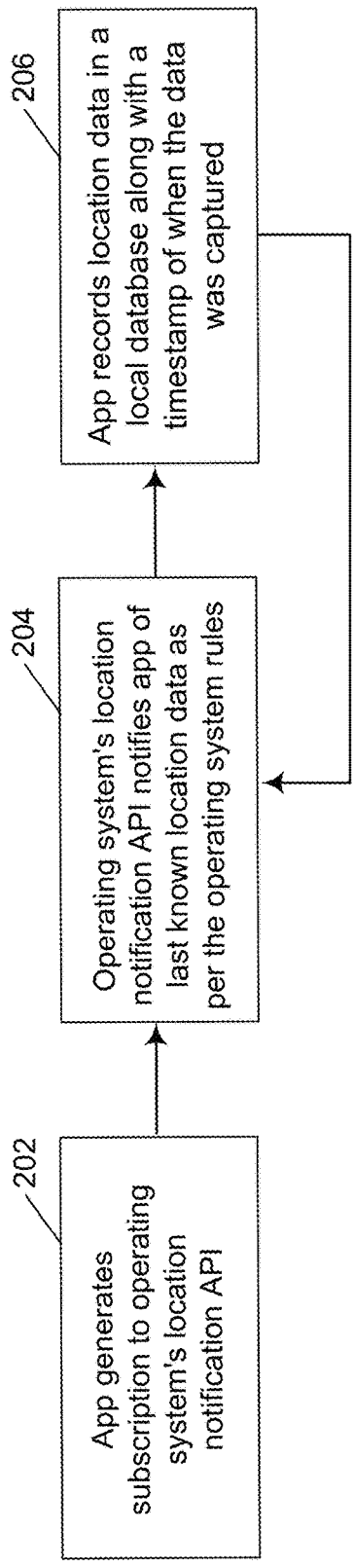
FIG. 2A is a flowchart illustrating an example process for capturing and recording visit data in accordance with some embodiments disclosed herein.

FIG. 2A is a flowchart illustrating an example process for capturing and recording visit data 125. The application 133 may record location data using a notification subsystem. When using a notification subsystem, the application 133 may generate a subscription to an operating system's location notification API (202). The operating system's location notification API may notify the application 133 of the last known location data as per the operating system rules (204). The application 133 may record the location data in a local database along with a timestamp of when the data was captured (206).

Figure 2B:
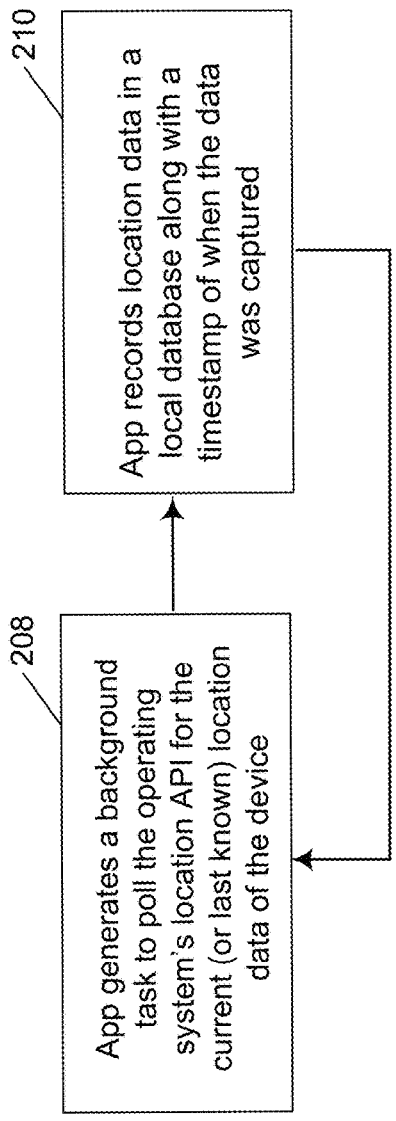
FIG. 2B is a flowchart illustrating an example process of a polling method for capturing and recording data in accordance with some embodiments disclosed herein.

FIG. 2B is a flowchart illustrating an example process of a polling method for capturing and recording location data. The application 133 may capture and record location data using a polling method depending on what is supported by the operating system and the permissions granted to the application 133 by a user. When using a polling method, the application 133 may generate a background task to poll the operating system's location API for the current (or last known) location data of the device (208). The application 133 may record the location data in a local database 124 along with a timestamp of when the data was captured (210).

Figure 3:
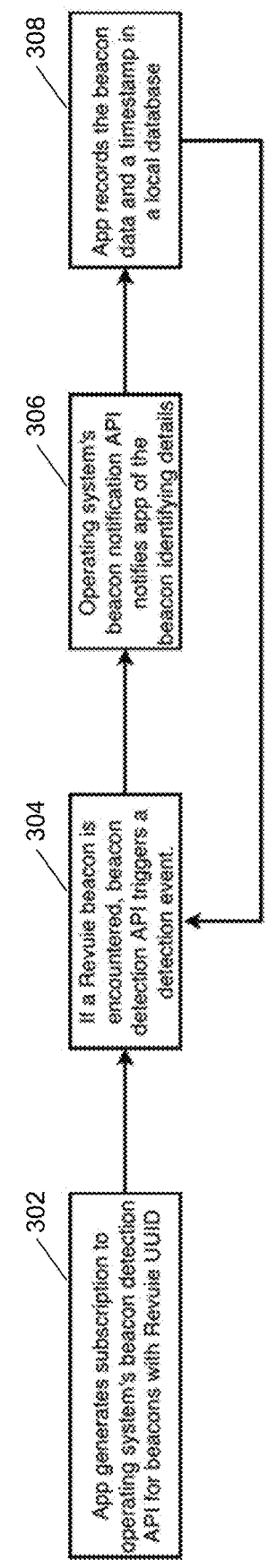
FIG. 3 is a flowchart illustrating an example process for capturing beacon data in accordance with some embodiments disclosed herein.

FIG. 3 is a flowchart illustrating an example process for capturing beacon data. The application 133 may record beacon data to represent the presence of Bluetooth beacons that have been issued by a business entity or other entity. For example, the application 133 installed on the mobile device 130 may be executed to create or generate a subscription to the operating system's beacon detection API, using a Universally Unique Identifier (UUID) to distinguish beacons (e.g., beacons associated with the systems and methods described herein) from other senders' beacons (302). In various embodiments, the UUID may include at least a UUID assigned to the entity that has issued the beacon (e.g., an entity UUID). The UUID may be broadcasted and detected by the application 133 or operating system running on a user mobile device to determine the presence of the beacon in the vicinity of the user mobile device 130. A beacon detection API may trigger a detection event on the user mobile device 130 (304). Upon a detection event of a beacon with the entity UUID being triggered, the operating system's beacon notification API may notify the application 133 of the beacon identifying details (306). The application 133 may record the identifying beacon parameters (e.g., MAC address, Major code and Minor code) and the recorded beacon distance with the timestamp in a local database 124 (308).

Where a chain of venues has their own beacons already installed, it may be possible for these to act as the business beacons in the following way.

1) The application 133 may be re-configured to listen additionally for the entity UUID and/or the beacon UUID.

2) The beacon parameters (MAC address, Major and Minor codes) may be added to the server database.

3) The application 133 may record the presence of the chain's beacons in the usual way as described above.

The application 133 can be modified to use other formats. For example, other types of beacons may use different parameters (e.g., rather than UUID, Major and Minor codes). For example, Eddystone beacons use namespace and instance, and some embodiments may use Eddystone beacons with namespace and instance parameters added to the server database instead of UUID, Major and Minor codes.

The application 133 can be modified to subscribe to other APIs and record the presence of other external devices using the same methodology. For example, WiFi hotspots could be issued to venues so they can offer WiFi to their customers. Unique identifying details of the hotspots may be stored in the local database to record their presence.

Figure 4:
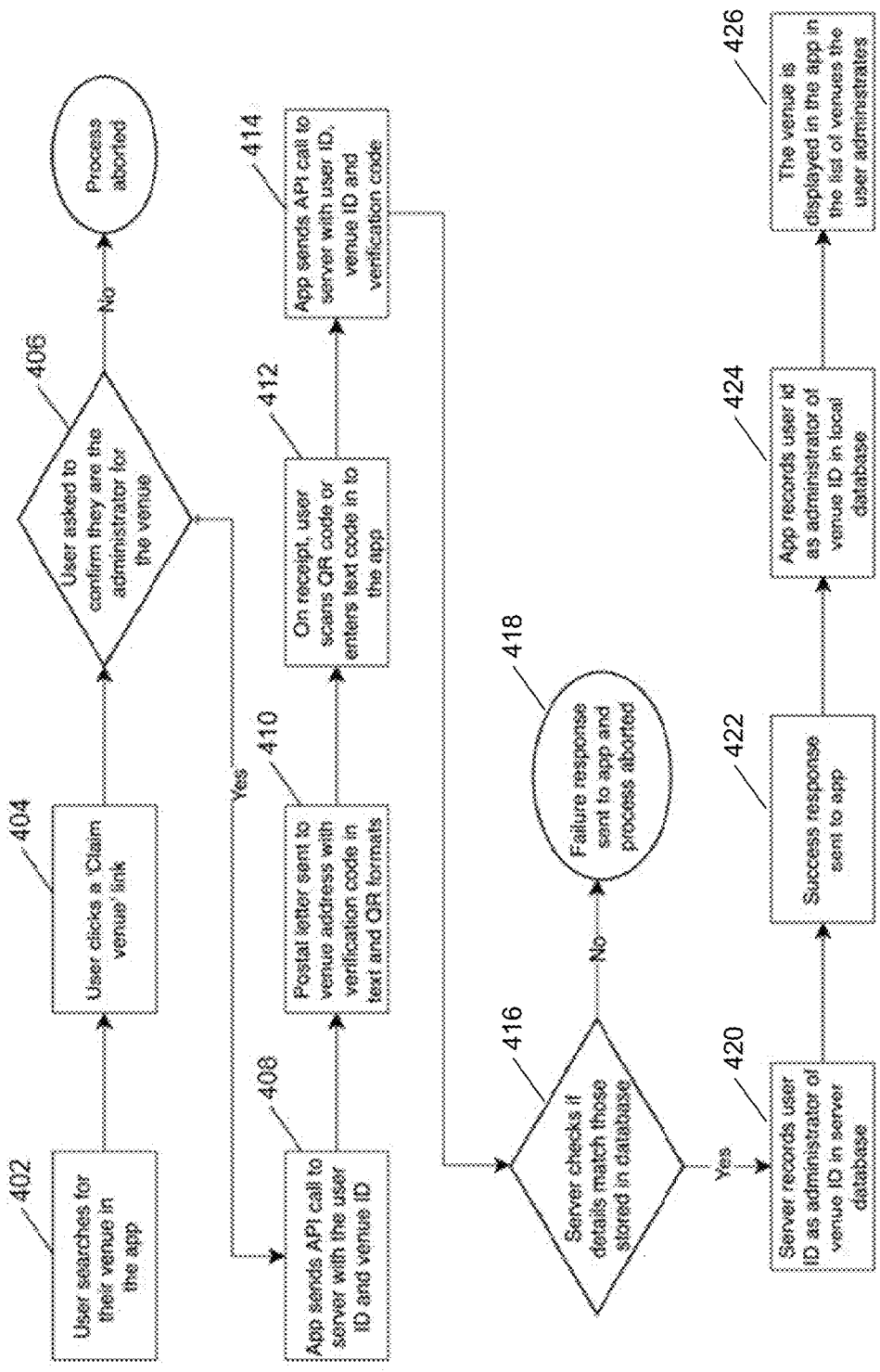
FIG. 4 is a flowchart illustrating an example process for claiming a venue and registering a Bluetooth beacon in accordance with some embodiments disclosed herein.

FIG. 4 is a flowchart illustrating an example process for claiming a venue and registering a Bluetooth beacon. A user can claim a venue to administer.

At 402-406, the user searches for their venue in the application 133 (402), clicks a 'Claim venue' link (404) or similar, and then confirms that they are the administrator for the venue (406).

At 408, upon receiving the confirmation, the application 133 may send an API call to the server 120 with the user and venue IDs (408).

At 410, a postal letter containing a verification code in text and QR code format may be sent to the address for the venue. Alternate processes could be used such as an automated telephone call to the phone number registered to the business or verification via a third-party service, for example. The venue details may be obtained from Google places or some other data source, for example. The verification code may be stored on the server (410).

At 412, on receipt of the letter, the user may scan the QR code, or type in the verification code text into the application 133.

At 414-426, the application 133 may send an API call to the server with the user ID, venue ID and the verification code (414). The server 120 may be configured to check if the user ID, venue ID and the verification code match the details of the corresponding data stored in the server (416). Upon determining there is a match (e.g., Yes at 416), the user may be confirmed as the administrator of the venue, and these details may be stored on the server (420). A success response may be sent to the application 133 (422). The application 133 may record the details including user ID as administrator of venue ID in the local database (424). The venue may be displayed in the user's list of venues they administrate (426). Otherwise, the server 120 may generate and send a failure response to the application 133, and the process may be aborted (418).

Figure 5:
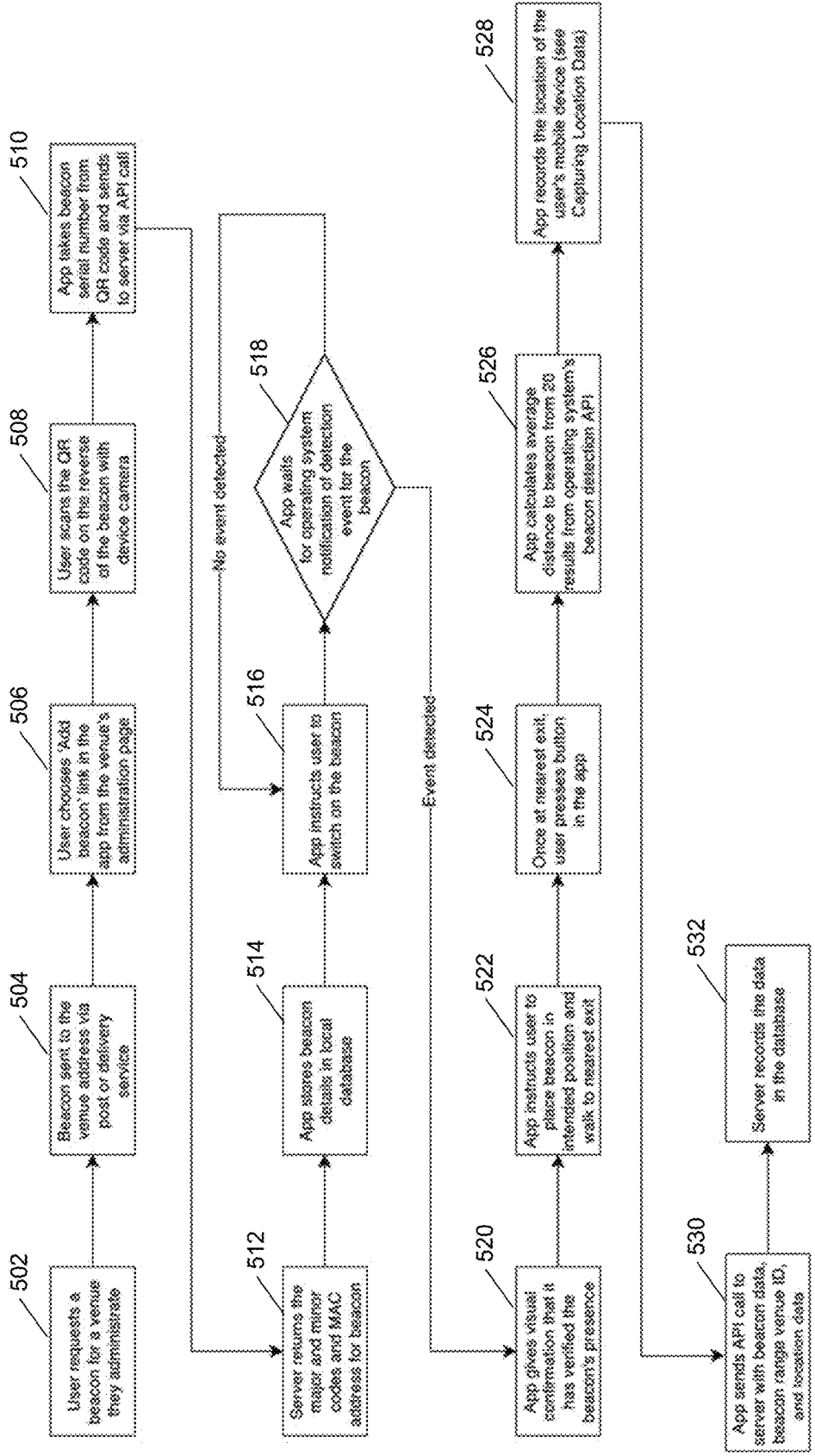
FIG. 5 is a flowchart illustrating an example process for registering a beacon in accordance with some embodiments disclosed herein.

FIG. 5 is a flowchart illustrating an example process for registering a beacon.

At 502-504, a user can request a beacon and choose to receive a Bluetooth beacon for a venue that they administer (502). The beacon may be sent to the user. The beacon may be sent to the venue address via post or delivery service. Once the user receives the beacon, they can register it to their venue (504).

At 506, the user navigates to the administration page for the venue and chooses to add the beacon via an "add beacon" link via the application 133 from from the venue's administration page.

At 508, the user may scan the QR code on the reverse of the beacon, which contains the serial number of the beacon and/or other identifying information of the beacon, for example.

At 510-512, the application 133 may send the beacon serial number from the QR code to the server 120 via an API call (510) or other mechanism, and receives back the major code, minor code and MAC address associated with the beacon from the server (512).

At 514-516, the application 133 may store the beacon details in the local database (514) and instruct user to switch on the beacon (for example, by removing battery isolation tab (516).

At 518, the application 133 waits to be notified of a detection event for the beacon by receiving a notification from the operating system or the processor 131.

At 520, The application 133 may give the user visual confirmation once it has verified the presence of the beacon (520).

At 522, the application 133 may instruct the user to place the beacon in its intended location (generally the centre of the venue, unless multiple beacons are being installed) and to walk to the venue exit which is nearest to the beacon (522).

At 524-526, once at the nearest exit, the user may press a button or otherwise issue a command in the application 133 (524). The application 133 may calculate and takes an average of the distance to the beacon reported by the operating system's beacon detection API, using a number of recorded distances (e.g., twenty recorded distances or some other quantity) as the dataset (526) in some embodiments.

At 528, the application 133 may be executed by the processor 131 to obtain and record the beacon data, average distance, venue ID, and the location data of the user's mobile device.

At 530, the application 133 may be executed by the processor 131 to send an API call or other communication to the server 120 with the beacon data, average distance, venue ID, and the location data of the user's mobile device. The location data of the user's mobile device may be obtained by the application 133 in the same way that location data is obtained in the normal use case above, for example.

At 532, the server 120 may update the database 124 to record that the beacon is installed at the venue, and the location data for the place the beacon was installed (beacon install location') and the range data calculated in the above process.

An alternative approach for registering the beacon may include enabling the application 133 to send the API call with the beacon physical installation location and the beacon serial number. The server 120 may check the beacon location against the venue location (optionally within a tolerance level). If the beacon physical installation location does not match the venue location, the server 120 may send a failure response to the application 133 of the mobile device 130, and the application 133 may instruct the user to move to the correct location and try again.

Figure 6:
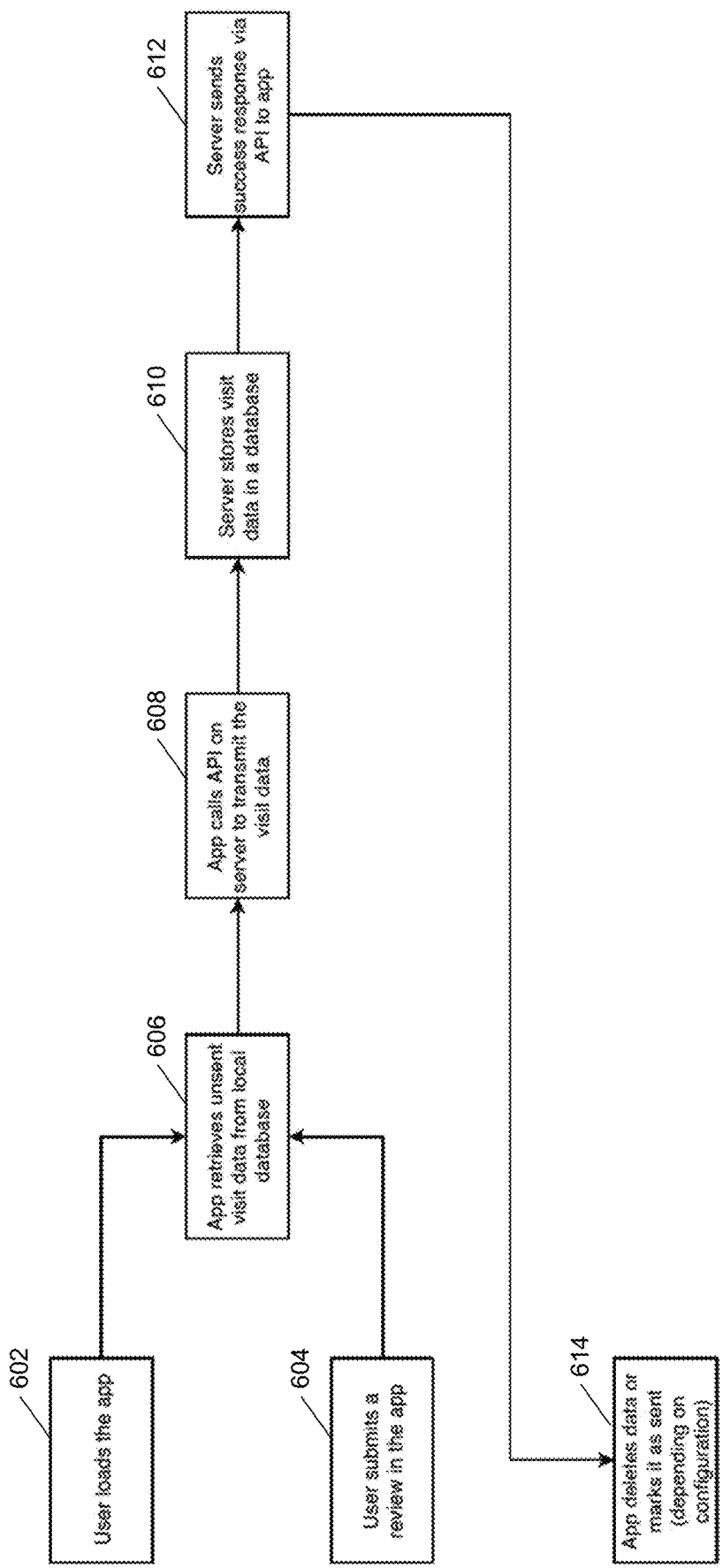
FIG. 6 is a flowchart illustrating an example method for transmitting visit data in accordance with some embodiments disclosed herein.

FIG. 6 is a flowchart illustrating an example process for transmitting visit data 125.

At 602-606, when the application 133 is loaded on the user mobile device 130 by the user (602), and/or when a review is created by the user in the application 133 (604), the application 133 may retrieve any visit data 125 stored in the local database (606).

At 608-612, the application 133 may call an API on the server 120 to send the visit data 125, which may be stored in a database 124 on the server 120 (608). Once the data is successfully stored (610), the server 120 may send a success response via the API to the application 133 (612). Upon receiving the success response, the application 133 may delete the data from the local database 124 to minimize data storage requirements, or it may flag the data as having been sent.

Figure 7:
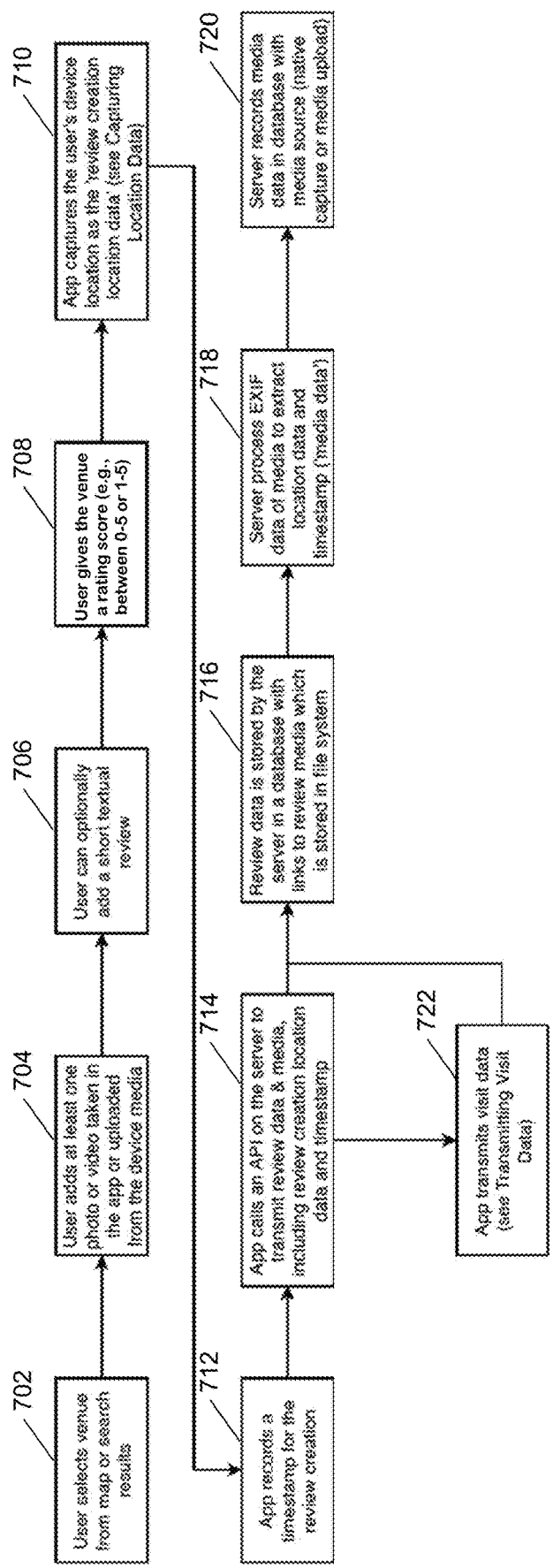
FIG. 7 is a flowchart illustrating an example process for capturing a review created by a user in accordance with some embodiments disclosed herein.

FIG. 7 is a flowchart illustrating an example process for capturing a review created by a user.

At 702, a user may select venue from a map or search results. For example, the user selects a restaurant, bar, hotel, establishment, place, event or other significant location (a 'venue') displayed in a map view, or searches for a venue by name and/or location and selects a result from the search.

At 704, the user may input their review (the 'review data'). A user can add one or more photos or videos ('review media'). At least one photo or video may be required to create a review in some embodiments. For example, the user can take a photo or record a video natively in the application 133 ('native capture'). The user can add a photo or video from their device's media storage, which was created outside the application 133 ('media upload').

At 706, the user can, in some embodiments optionally, input a short textual review. In some embodiments, the text may be limited to 500 characters, although this character limit (or a word limit) may be different in other embodiments. At 708, the user may give the venue a rating score (e.g., between 1 and 5). At 710 and 712, the application 133 may append to the review data the longitude and latitude data captured from the user's mobile device as the 'review creation location data' for the review and record a timestamp for the 'review creation' event. This may be a separate operation in addition to the location data of the mobile device captured by the application 133 as part of the visit data 125.

At 714, the application 133 may call an API on the server 120 to transmit the review data and the review media. At 716, the review data may be stored by the server 120 in a database, along with links to the review media, which may be stored in the file system of the server.

At 718, the server 120 may process the review media to extract the location data and a timestamp from the EXIF data.

At 720, the server 120 may record the media data in the database along with media source about whether the review media was obtained by native capture or media upload ('media source').

Figure 8:
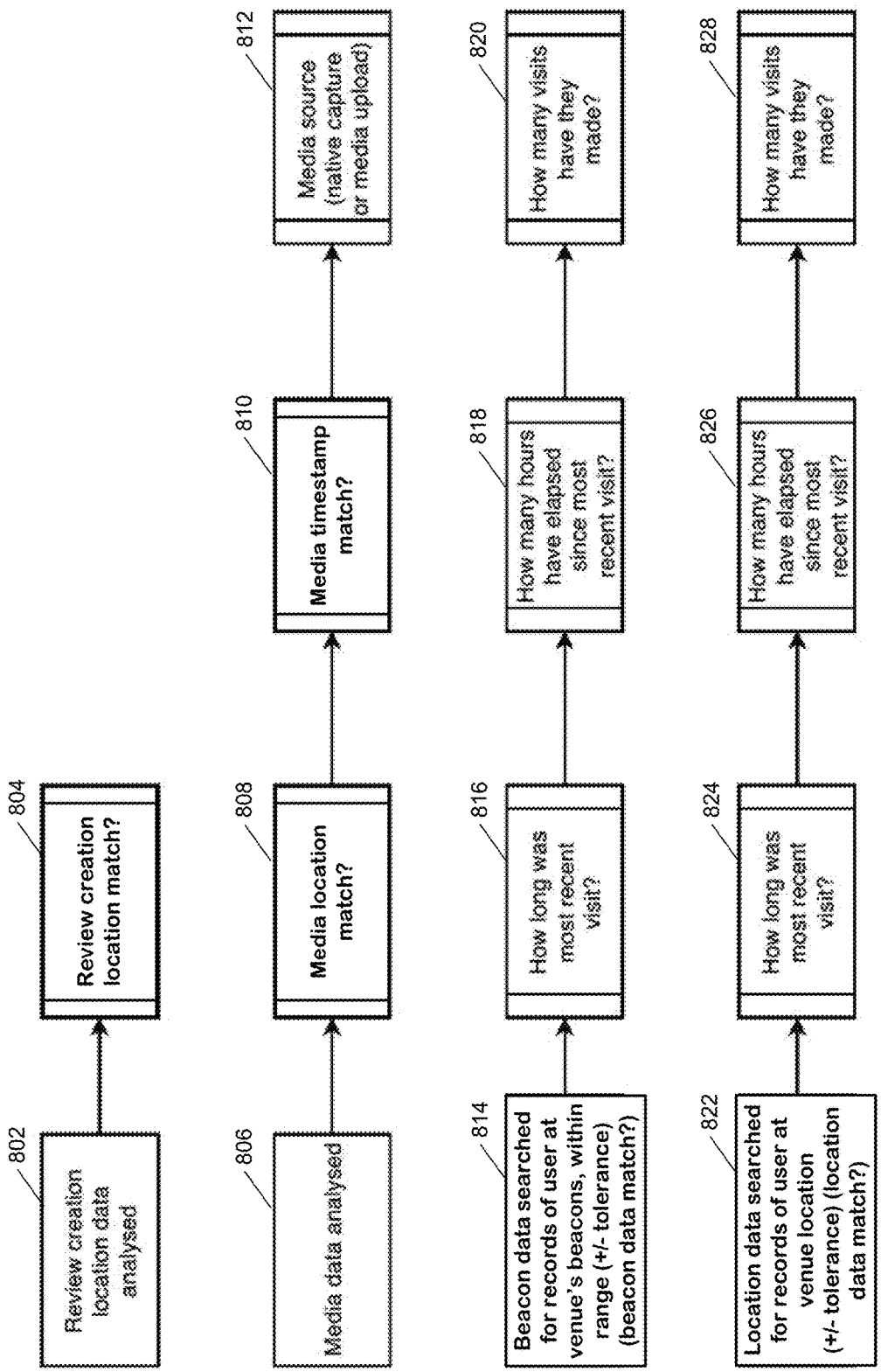
FIG. 8 is a flowchart illustrating an example process for evaluating the data to establish the review metrics in accordance with some embodiments disclosed herein.

FIG. 8 is a flowchart illustrating an example process for evaluating the data to establish the review metrics. The elements of FIG. 8 may be performed together or, in some embodiments, may be a set of separate processes that may be performed with or without one another. The visit data 125 and the review data 126 may be analysed to establish the following items, for example.

1) The review creation location data is analysed (802) and compared to the location stored in the venue data 127 to establish if the user was at the venue when the review was created ('review creation location match') (804).
2) At 806-812, the media data may be analysed to establish:
    i. Whether location of the media matches the venue location (optionally, this can be within a tolerance level) ('media location match') (808)
    ii. Whether the media timestamp matches a record or records from the visit data 125 ('media timestamp match') (810)
    iii. Media source ('native capture' vs 'media upload') (812)
3) At 814, beacon data may be searched for one or more records of the user in the presence of a venue's beacons within a tolerance range. This may be established by looking for records of beacon notification events that contain the user ID of the person making the review, a beacon that is registered to the venue, and a range from the beacon that is within the distance set in the pairing process (optionally, this can be within a tolerance level), for example. This may be stored as a binary (yes/no) value or as an integer to record the number of records.
4) At 816-820, the processes and/or data may be established from the retrieved record, including:
    i. How long the user was at the venue on their most recent visit (816);
    ii. How many hours had elapsed from the end of their most recent visit in the visit data 125 to the review creation time (818);
    iii. How many visits they have made to the venue (820).
5) The location data may be searched for one or more records of the user at the venue location ('location data match') (822). This may be established by searching for records of the user location data which may include the user ID, and a latitude and longitude that matches the location in the venue data 127 (optionally, this can be within a range of a tolerance level). This may be stored as a binary (yes/no) value or as an integer to record the number of records. In addition, the following processes and or data may be established from the retrieved records (822).
    i. How long the user was at the venue on their most recent visit (824).
    ii. How many hours had elapsed from the end of their most recent visit in the visit data 125 to the review creation time (826).
    iii. How many visits they have made to the venue (828).

An alternative approach to analyse visit data 125 in the review metrics may include an approach wherein the range from the beacon in the beacon data is included in the review metrics rather than being used as a filter. This may become a factor that is available for the algorithm and may be used to provide part of the granularity of the authority score. Similarly, a larger tolerance may be used with the location data, and the distance from the venue location may be included in the review metrics also, so that it may be used as a factor in the algorithm. If the location data match and beacon data match values are being used as binary (yes/no), the distances recorded under this approach may be for the most recent visits for the relevant data set. If the location data match and beacon data match values are being used as integers to record the number of matches, the distances recorded for under this approach may be averages of all visits for the relevant dataset.

Another alternative approach may include storing the visit data 125 as two arrays in the review metrics, one for beacon data and another for location data. This may replace the beacon data match and location data match variables, and the number of visits. The distance from the beacon or the venue location (subject to any tolerance) may be used as a filter when creating these arrays, or the data could be included as another factor for the algorithms.

The beacon data array may include: 1) the length of the visit; 2) the hours elapsed between the visit and the review creation time; and 3) the average distance from the beacon for the visit (if not used as a filter), for example.

The location data array may include: 1) the length of the visit; 2) the hours elapsed between the visit and the review creation time; 3) the average distance from the venue location for the visit (if not used as a filter), for example.

In some embodiments, alternative approaches to analyse media data in the review metrics may be adjusted to accommodate for multiple photos or videos. These approaches may provide more granularity for the algorithm. One approach may be to use integers to record the following data:
    1) The media location match—set to the number of media records that match the venue location;
    2) The media timestamp match—set to the number of media records where the timestamp matches a record or records from the visit data 125;
    3) Native capture—set to the number of media records where the source is native capture; and
    4) Media upload—set to the number of media records where the source is media upload.

Another alternative approach may be to use an array with binary values for each photo or video for:
    1) Media location match;
    2) Media timestamp match;
    3) Native capture; and
    4) Media upload.

In some embodiments, the authority score may be calculated by utilizing an algorithm. Example algorithms are described below, but they can be varied to increase or decrease the importance of one or more of the factors, or to omit or introduce factors. The algorithms may share the following characteristics. They may establish an authority score with a high level of granularity, which may be used for the input to the display element. The algorithms may utilize multiple factors of the review metrics to achieve this granularity. For example, the following factors may be considered:
    1) Whether there is a beacon data match;
    2) Whether there is a review creation location match or location data match;
    3) How many hours have passed since the most recent visit (either from beacon data or location data);
    4) Whether there is media location match;

5) Whether the media source is native capture or media upload; and
6) Whether there is a media timestamp match.

The algorithms may optionally use extrinsic data to further refine the score. The extrinsic data may include:
1) Whether one or more beacons have been registered as present at the venue by the venue administrator ('beacon presence').
2) The length of stay indicated for the user as a comparison to the average length of stay for that venue, or that type of venue. The score could be adjusted based on the variance from the average. For example, an extremely short stay might be taken as an indication that the user did not stay long enough to form an authoritative opinion of the venue, and therefore reduce the score.
3) The time of the visit could be compared to the opening hours of the venue, and negatively adjust the score if the visit is outside the opening hours.
4) The score could be adjusted if the user has visited a large number of similar establishments and could be considered to have a greater deal of comparative experience.

FIG. 9A is a flowchart of a process which emphasises beacon data matches and location data matches and adjusts for recency of visit. FIG. 9B is a flowchart corresponding to FIG. 9A with example values. The algorithm may include a method to distinguish a review creation location match from a location data match. It may use media data as a secondary factor.

At 902, the authority score may be initially set to a base value 'a' (for example, 0).

At 904, the review metrics value for review creation location match may be checked to determine whether the review creation location matches the venue location data.
1) If the review metrics confirm a review creation location match (e.g., a "yes" at 904), an amount or value (for example, "add 25" as shown in FIG. 9B) may be added to the score and the process goes to step 908.
2) If the review metrics do not confirm a review creation location match (e.g., a "no" at 904), the process goes to step 906.

At 906, if the review metrics confirm a location data match (e.g., a "yes" at step 906), an amount may be added to the score and adjusted for how recent the latest visit was. An example calculation for this is: $c*(1-(\text{hours since visit})/d)$. Example values for c and d are 25 and 1000 respectively.

If the review metrics do not confirm a location data match (e.g., a "no" at step 906), the score is not changed and the process goes to step 908.

At 908, the extrinsic data may be checked for beacon presence.

If the beacon presence is confirmed (e.g., a "yes" at step 908), the review metrics may be checked for beacon data match (910).
1) If the beacon data match is confirmed (e.g., a "yes" at step 910), an amount may be added to the score, adjusted for how recent the latest visit was. An example calculation for this is: $f*(1-(\text{hours since visit})/g)$. Example values for f and g are 50 and 1000 respectively and the process goes to step 912.
2) If the beacon data match is not confirmed (e.g., a "no" at step 910), an amount 'e' (for example 25) may be deducted from the score and the process goes to step 912.

If the beacon presence is not confirmed (e.g., a "no" at step 908), the score is left unchanged and the process goes to step 912.

At 912, the review metrics may be checked for the media source.
1) If the media source is native capture, an amount 7 (for example 10) may be added to the score and the process goes to step 914.
2) If the media source is media upload, then an amount or value 'h' (for example 5) may be deducted from the score and the process goes to step 914.

At 914, the review metrics may be checked for media location data match.
1) If the review metrics confirm a media location data match (e.g., a "yes" at step 914), an amount or value 'k' (for example 15) may be added to the authority score and the process goes to step 916.
2) If the review metrics do not confirm a media location data match (e.g., a "no" at step 914), an amount or value 7 (for example 15) may be deducted from the authority score and the process goes to step 916.

Figure 10A:
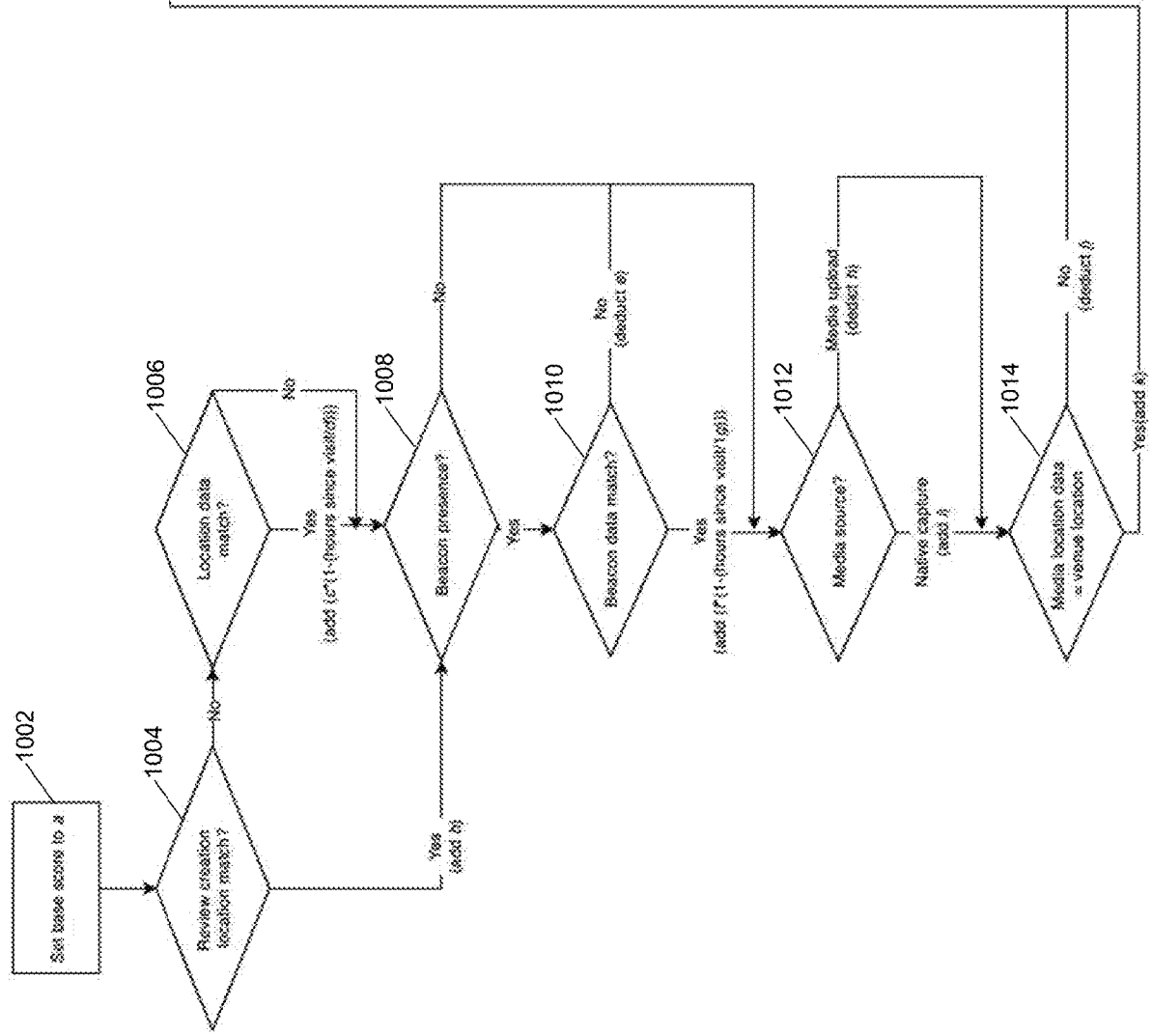
FIG. 10A is a flowchart illustrating another example process for utilizing an algorithm similar to that illustrated in FIG. 9A which also adjusts for the length of the visit compared to the average length of visits according to some embodiments disclosed herein.
Figure 10B:
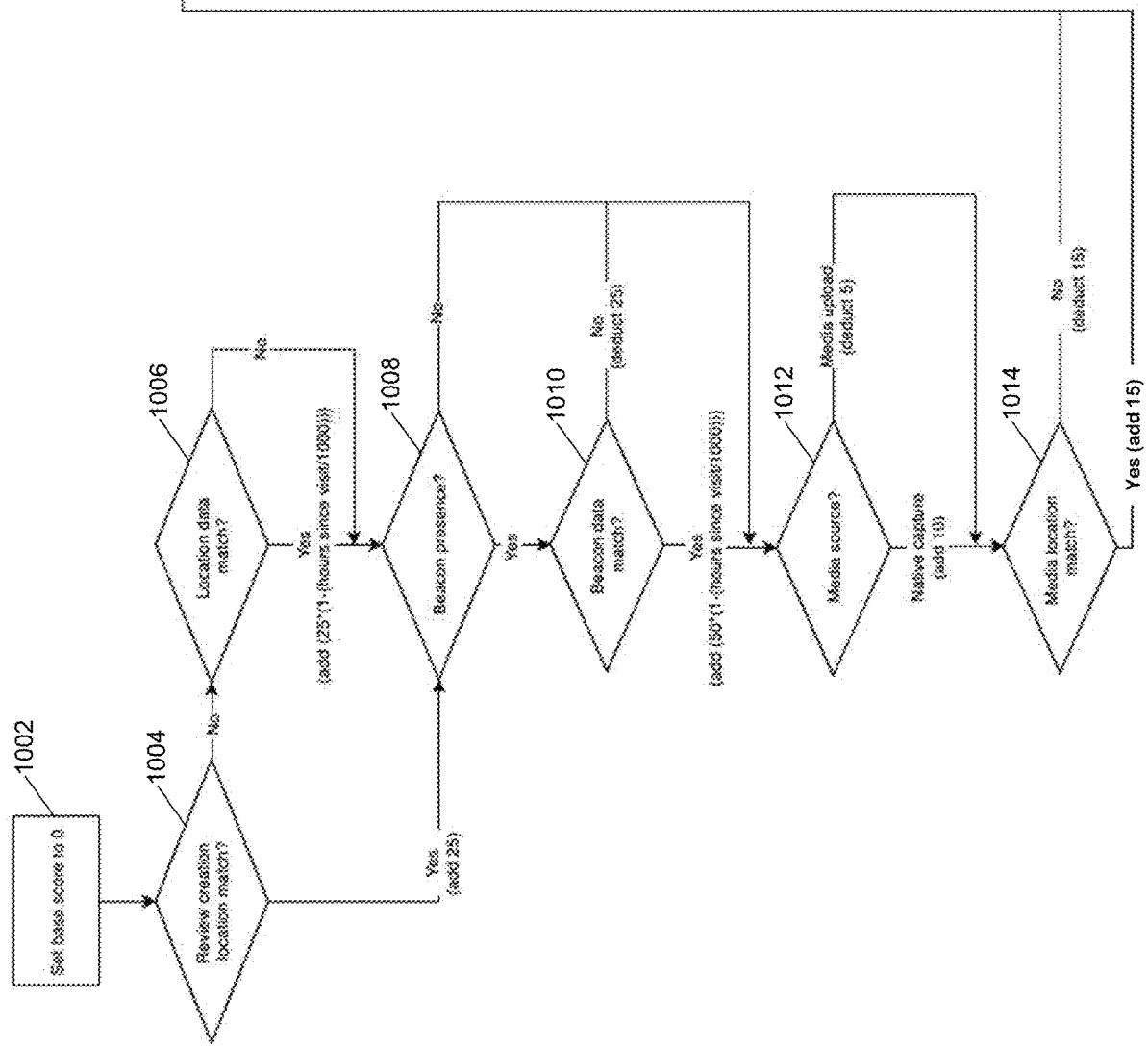
FIG. 10B is a flowchart corresponding to FIG. 10A with example values according to some embodiments disclosed herein.

FIG. 10A is a flowchart similar to that illustrated in FIG. 9A which also adjusts for the length of the visit compared to the average length of visits. FIG. 10B is a flowchart corresponding to FIG. 10A with example values.

At 1002-1014, an example algorithm B incorporates the example algorithm A in FIG. 9A as a base. The example algorithm B adds an extra step 1016 to use extrinsic data to adjust the score.

At 1016, the length of the visit (from beacon data, or if not present then location data) may be compared to the average length of all visits to the venue, to determine whether it is within a range of 'l'-'m'% (for example 50-300%) compared to the average visit duration. At 1018,
1) if the length of the visit is within the range (e.g., a "yes" at step 1016), the score is unchanged and may be returned to the server 120.
2) If the length of the visit is outside the range (e.g., a "no" at step 1016), an amount or value 'n' (for example 20) may be deducted from the score. The deducted score may be returned to the server 120.

Figure 11A:
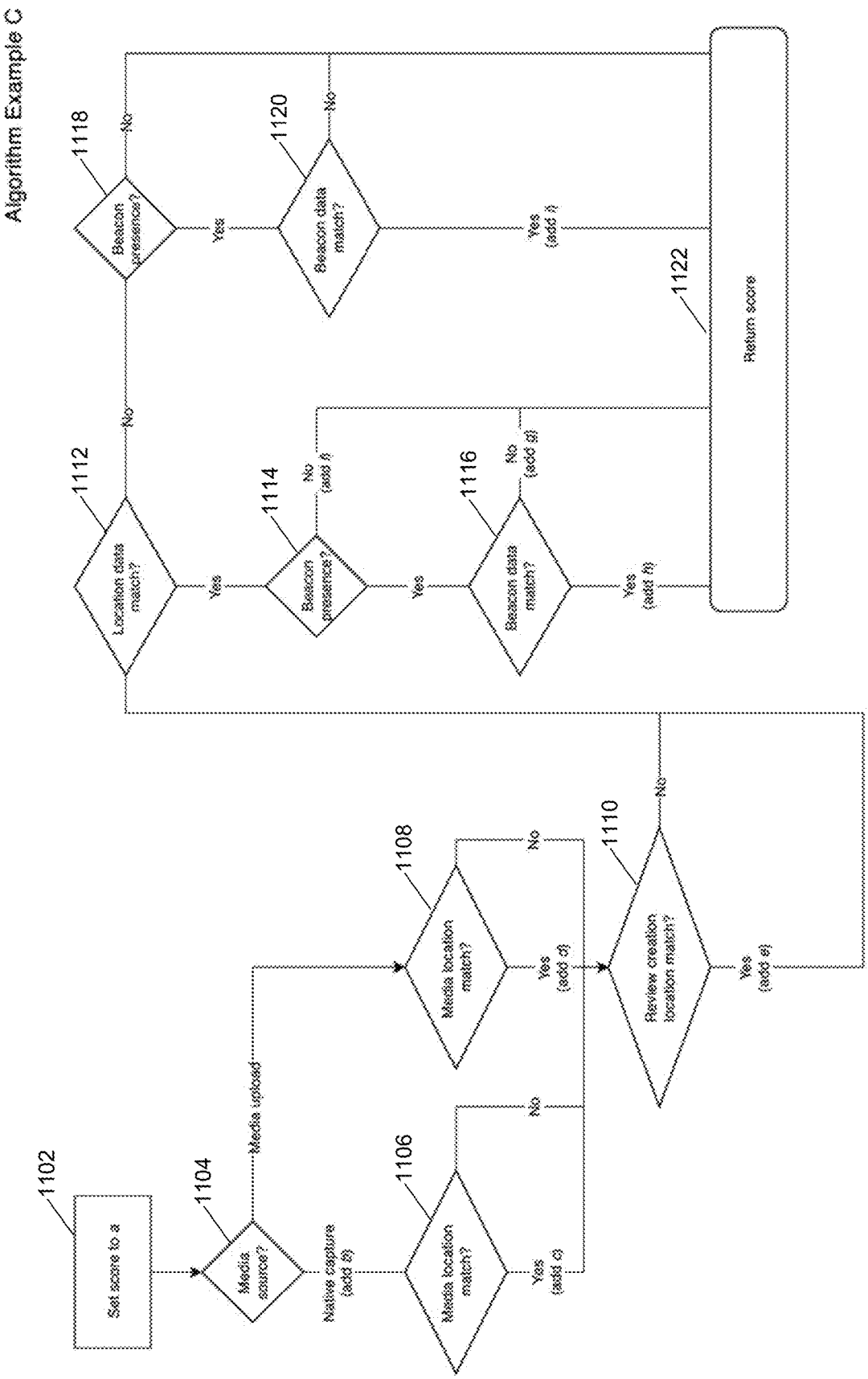
FIG. 11A is a flowchart illustrating an example process for utilizing an algorithm to give more emphasis to reviews created within the application at the time of the visit rather than those added after the visit according to some embodiments disclosed herein.
Figure 11B:
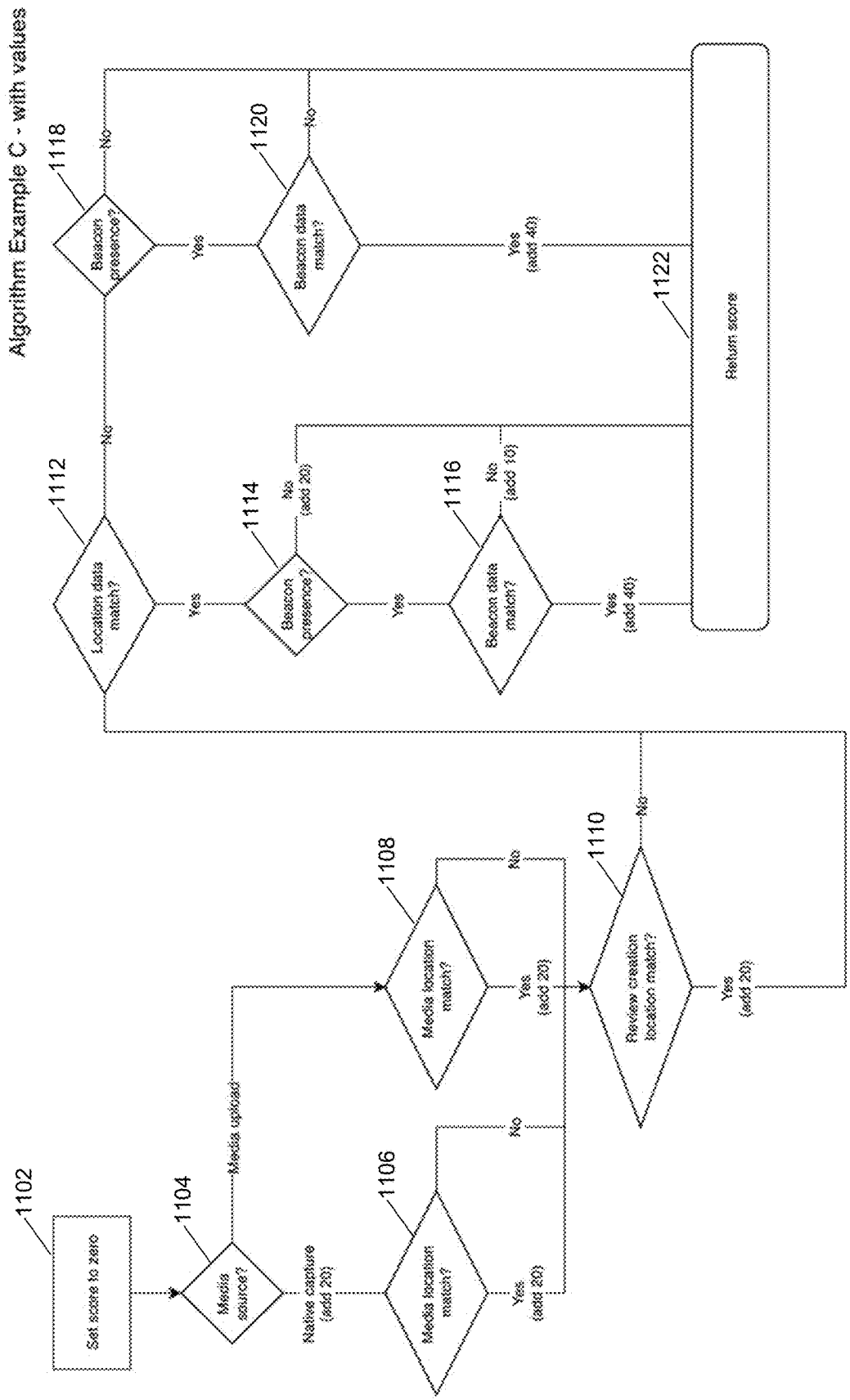
FIG. 11B is a flowchart corresponding to FIG. 11A with example values according to some embodiments disclosed herein.

FIG. 11A is a flowchart illustrating an example process for utilizing an algorithm C to give emphasis to reviews created within the application at the time of the visit rather than those added after the visit. FIG. 11B is a flowchart corresponding to FIG. 11A with example values. Example C describes an algorithm that can be used to give more emphasis to reviews that are created live in the application 133 whilst at the venue location, rather than added after the visit. It may use visit data 125 as a secondary factor.

At 1102, the authority score may be initially set to a base value 'a' (for example, "0" as shown in FIG. 11 B).

At 1104, the review metrics may be checked for the media source.

If the media source is native capture at 1104, an amount and value (for example 20) may be added to the score, and the process goes to step 1106. At 1106, the review metrics may be checked for media location match.
1) If the review metrics confirm a media location match (e.g., a "yes" at step 1106, an amount or value 'c' (for example 20) may be added to the score.
2) If the review metrics do not confirm a media location match (e.g., a "no" at step 1106, the score is left unchanged and the process goes to step 1110.

At 1104, if the media source is media upload, the score is left unchanged and the process goes on to step 1108.

At 1108, the review metrics may be checked for media location match.

1) If the review metrics confirm a media location match (e.g., a "yes" at step 1108), an amount or value 'd' (for example 20) may be added to the authority score.
2) If the review metrics do not confirm a media location match (e.g., a "no" at step 1108), the score is left unchanged and the process goes to step 1110.

At 1110, the review metrics may be checked for review creation location match.
1) If the review metrics confirm a review creation location match (e.g., a "yes" at step 1110), an amount or value 'e' (for example 20) may be added to the score and the process goes to step 1112.
2) If the review metrics do not confirm a review creation location match (e.g., a "no" at step 1110), the score is unchanged, and the process goes to step 1112.

At 1112, the review metrics may be checked for location data match.
1) If the review metrics confirm a location data match (e.g., a "yes" at step 1112), the extrinsic may be checked for beacon presence and the process goes to step 1114.
2) If the review metrics do not confirm a location data match (e.g., a "no" at step 1112), the extrinsic data may be checked for beacon presence and the process goes to step 1118.

At 1114, if the extrinsic data confirms beacon presence (e.g., a "yes" at step 1114), the process goes to step 1016.
1) At 1116, if the review confirm a beacon data match (e.g., a "yes" at step 1116), an amount 'h' or value (for example 40) may be added to the score, and the score may be returned to the server 120 (1122).
2) At 1116, if the review metrics do not confirm a beacon data match (e.g., a "no" at step 1116), an amount or value 'g' (for example 10) may be added to the score, and the score may be returned to the server 120 (1122).

At 1114, if the extrinsic data does not confirm beacon presence (e.g., a "no" at step 1114), an amount or value T (for example 20) may be added to the score, and the score may be returned to the server 120 (1122).

At 1112, if the review metrics do not confirm location data match (e.g., a "no" at step 1112), the extrinsic data may be checked for beacon presence and the process goes to step 1118.

At 1118, if extrinsic data confirms beacon presence (e.g., a "yes" at step 1118), the process goes to step 1120.
1) At 1120, if the review metrics confirm beacon data match (e.g., a "yes" at step 1120), an amount (for example 40) may be added to the score.
2) At 1120, if the review metrics do not confirm beacon data match (e.g., a "no" at step 1120), the score is unchanged.

At 1122, the score may be returned to the server 120.

Figure 12A:
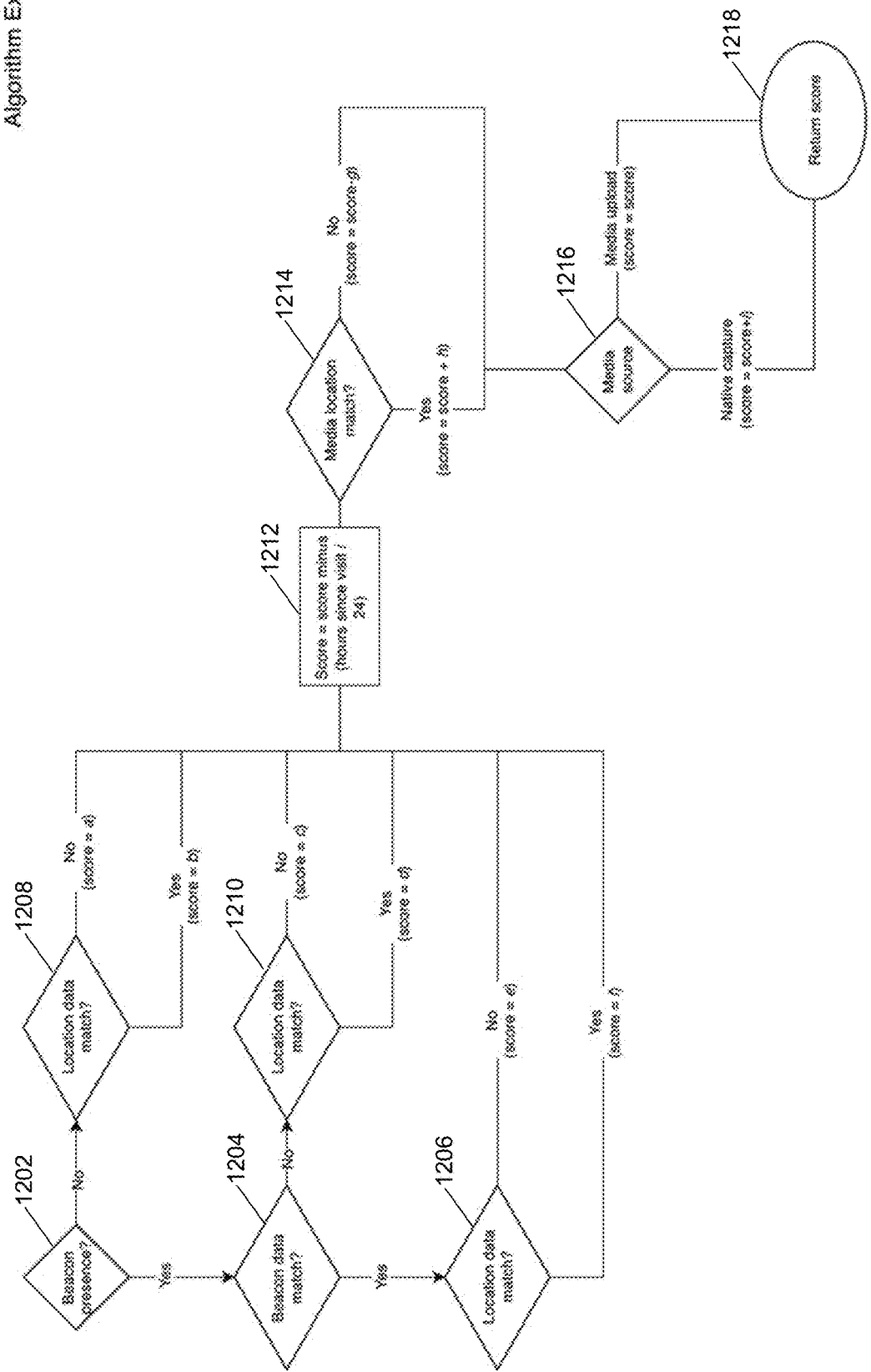
FIG. 12A is a flowchart illustrating an example process for utilizing an example algorithm similar to that illustrated in FIG. 9A but which takes a different approach to setting base scores according to some embodiments disclosed herein.
Figure 12B:
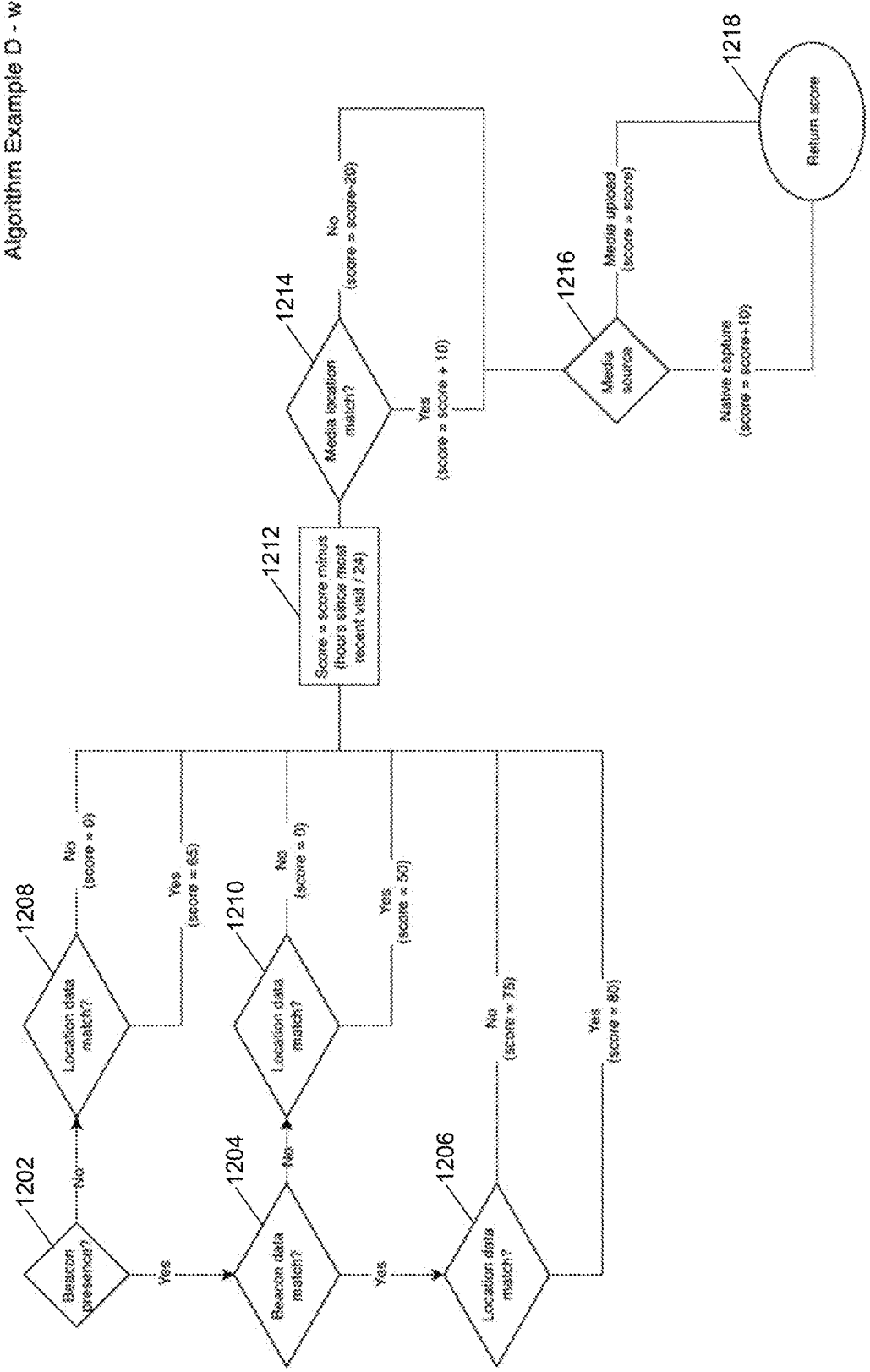
FIG. 12B is a flowchart corresponding to FIG. 12A with example values according to some embodiments disclosed herein.

FIG. 12A is a flowchart illustrating an example process for utilizing an example algorithm D similar to that illustrated in FIG. 9A but which takes a different approach to setting base scores. FIG. 12B is a flowchart corresponding to FIG. 12A with example values. The example algorithm D describes an algorithm that is similar in emphasis to the example algorithm A in FIG. 9A, but takes a different approach and adjusts for recency once a base score has been established from the type of visit data 125. Media data may be used as a secondary factor.

At 1202, the extrinsic data may be checked for beacon presence. If the extrinsic data confirms beacon presence (e.g., a "yes" at step 1202), the process goes to step 1204. If the extrinsic data does not confirm beacon presence (e.g., a "no" at step 1202), the process goes to step 1208.

At 1204, if the review metrics indicate a beacon data match (e.g., a "yes" at step 1204), the process goes to 1206.
1) At 1206, if the review metrics confirm a location data match (e.g., a "yes" at step 1206), the score may be set to an amount or value 'f' (for example 80) and the process goes to step 1212.
2) At 1206, if the review metrics do not confirm a location data match (e.g., a "no" at step 1206), the score may be set to an amount or value 'e' (for example 75) and the process goes to step 1212.

At 1204, if the review metrics do not confirm a beacon data match (e.g., a "no" at step 1204), the process goes to 1210.
1) At 1210, if the review metrics confirm a location data match (e.g., a "yes" at step 1210), the score may be set to an amount or value 'd' (for example 50) and the process goes to step 1212.
2) At 1210, if the review metrics do not confirm a location data match (e.g., a "no" at step 1210), the score may be set to an amount or value 'a' (for example 0) and the process goes to step 1212.

At 1208, if the extrinsic data does not confirm beacon presence (e.g., a "no" at step 1202), the review metrics may be checked for location data match.
1) At 1208, if the review metrics confirm location data match (e.g., a "yes" at step 1208), the score may be set to an amount or value 'd' (for example 65)
2) At 1208, if the review metrics do not confirm location data match (e.g., a "no" at step 1208), the score may be set to an amount or value 'c' (for example 0) and the process goes to step 1212.

At 1212, the score may be adjusted for recency by deducting the amount of hours since the most recent visit divided by 24. In the limbs where the score is set to values a or c (e.g., the "no" at step 1210 and the "no" at step 1208), there may be no visit data 125 and so no deduction is applied to the score at 1212. Further, the location data and beacon data may have different timestamps. It is the most recent visit from all visit data 125 that may be used in this step.

At 1214, the review metrics may be checked for media location match.
1) If the review metrics confirm media location match (e.g., a "yes" step at 1214), an amount or value 'h' (for example 10) may be added to the score.
2) If the review metrics do not confirm media location match (e.g., a "no" step at 1214), an amount or value 'g' (for example 20) may be deducted from the score.

At 1216, the review metrics may be checked for the media source.
1) If the media source is native capture (e.g., a "yes" step at 1216), an amount or value 7 (for example 10) may be added to the score.
2) If the media source is media upload (e.g., a "no" step at 1216), the score is unchanged.

At 1218, the score may be returned to the server 120.

Once the server has established the authority score, the authority score may be transmitted and saved to the database.

In the above algorithms, many processes use addition or subtraction values such as j and k to adjust scores. However, in some embodiments, any scores in any of the algorithms above could be left unchanged to alter the operation of the algorithms by setting the addition or subtraction value to 0.

Figure 13:
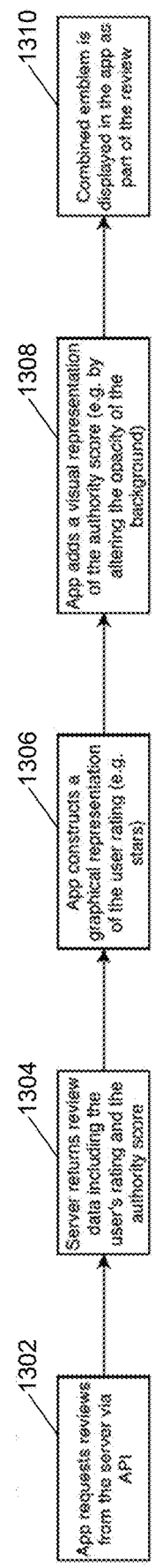
FIG. 13 is a flowchart illustrating an example process for displaying the authority score and the user rating according to some embodiments disclosed herein.

FIG. 13 is a flowchart illustrating an example process for displaying the authority score and the user rating.

At 1302, the application 133 requests reviews of a venue via API from the server 120.

At 1304, in response to the request from the application 133, the server 120 may return review data including user rating and the authority score along with review media.

At 1306, the application 133 may receive the authority score and the review data via the API and display the authority score along with the user rating. The application 133 may be configured to construct a graphical representation of the user ratings as emblems with a group of stars.

Figure 14:
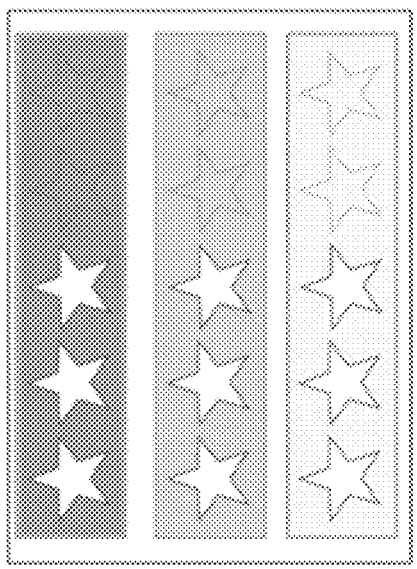
FIG. 14 shows an example graphical representation of the user ratings according to some embodiments disclosed herein.

FIG. 14 shows an example graphical representation of the user ratings to generate a visual indication of the authority score. The visual indication may have at least one visual characteristic determined by at least one outcome of the calculation. The at least one visual characteristic may include a first shaded or colored area and a second shaded or colored area, and wherein the calculation is configured so that a contrast between the first shaded or colored area and the second shaded or colored area increases as the authority score increases. the at least one visual characteristic comprises a first shaded or colored area and a background, and wherein the calculation is configured so that a visibility of the first shaded or colored area against the background increases as the authority score increases.

At 1308, the application 133 may be configured to add a visual representation of the authority score by altering the opacity of the background.

At 1310, the application 133 may combine an emblem to be displayed as part of the review.

In order to provide the end user with the rating that the reviewer gave the venue and also the authority score as two separate pieces of information, the end user may be required to consider both scores and make a decision as to how to interpret them. There may be a number of drawbacks, including:

1) Increasing the amount of time takes the end user to establish which reviews are authentic.
2) Giving the end user information overload, especially where there a high number of reviews.
3) Potentially emphasising the review rating over the authority score. For example, if the review rating was a series of stars, and the authority score displayed as a percentage, the rating may draw more attention, and result in the end user inadvertently making a decision based on reviews with low authority.

The authority score may be used to filter out reviews that are below a threshold, but this may be undesirable in some cases, as the existence of the reviews with lower authority scores may be useful data for the end user. Thus, the end user should be able to see all reviews, and quickly and easily distinguish which ones they want to pay attention to. To accomplish this and aid understanding for the end user, the two scores may be combined into one graphic representation.

An example of one method to achieve this is described below, and the ratings may be as illustrated in FIG. 14.

1) The review rating may be displayed as a series of stars with five stars being the highest rating, for example. The rating may be displayed by setting the stars to a foreground colour of white to reflect the rating score, and leaving them transparent otherwise (although other colour combinations may be possible). For example, a score of 3 out of 5 may have three stars with a white foreground and two stars that are transparent. The stars may have a solid border (in this example grey) which may be bolder on the white stars.
2) The authority score may be displayed as a background to the star rating. The background may have a bottom layer of white and a top layer which is filled with a colour (in this example orange). The opacity of the colour may be set based on the authority score, divided by 100. Thus, an authority score of 100 may give an opacity of 1, which means that the background is full-coloured, with no transparency. An authority score of 0 may give an opacity of 0 and therefore the colour may be completely transparent, and therefore display as white.
3) In this example, a review with a high authority score will stand out visually, and the review rating will be easy to see. Conversely, a review with a low authority score will fade into the background, and the review rating will have less impact, especially when the end user is scrolling quickly through the reviews.

Alternative methods to display the authority score may include:

1) Using the authority score to vary the size of the review rating emblem, so a high authority score may mean the review rating is visually larger.
2) Using the authority score to display an authority bar as part of the rating emblem, with the bar being the full width of the emblem for an authority score of 100, reducing to no bar for an authority score of 0.
3) Using the authority score to change the opacity of the foreground colour of the review rating, so the stars (or other emblem) change rather than the background.
4) Using the authority score to adjust the vertical fill of the foreground in the rating emblem, for example, so the user rating dictates how many stars are filled in with the foreground colour, but the authority score dictates whether that foreground colour goes from the bottom to the top of the star.
5) Using the authority score to change the colour of the background.

Various processes and routines can be optionally implemented on the server 120 to re-evaluate and update the authority scores of previous reviews on the basis of either aggregated data or extrinsic data. Factors that could be relevant may include:

1) Analysis of beacon data against beacon presence. Some algorithms may downgrade the authority score if there is beacon presence but no beacon data. However, a beacon may become faulty, lose power, or be stolen—and therefore reviews would have been downgraded unnecessarily. If all recent reviews, with sufficient volume, for a venue show no beacon data despite it having beacon presence, reviews after the last review with beacon data could be re-evaluated on the basis of the venue not having beacon presence.
2) Analysis of location data and beacon data against venue location and beacon install location. If a beacon has been moved to a new location in an attempt to provide falsely authentic reviews, the relationship between location data and beacon data may change. Some algorithms may prioritise beacon data over location data. If all recent reviews, with sufficient volume, show location data that is inconsistent with the venue location or the beacon install location, reviews after the last review where the data was consistent could be re-evaluated on the basis of the venue not having beacon presence.
3) Age of reviews. Reviews from a number of years ago may no longer be relevant, even though they were authoritative at the time. Thus, authority scores may be degraded over time, by a factor of time elapsed since the review was created.

4) User behaviour. A user may inadvertently add a review with a low authority score. Or they may start to add low authority reviews after adding a number of high authority reviews. Calculation of the overall authority of a user's reviews could be used to adjust the authority score of any outliers.

Figure 15:
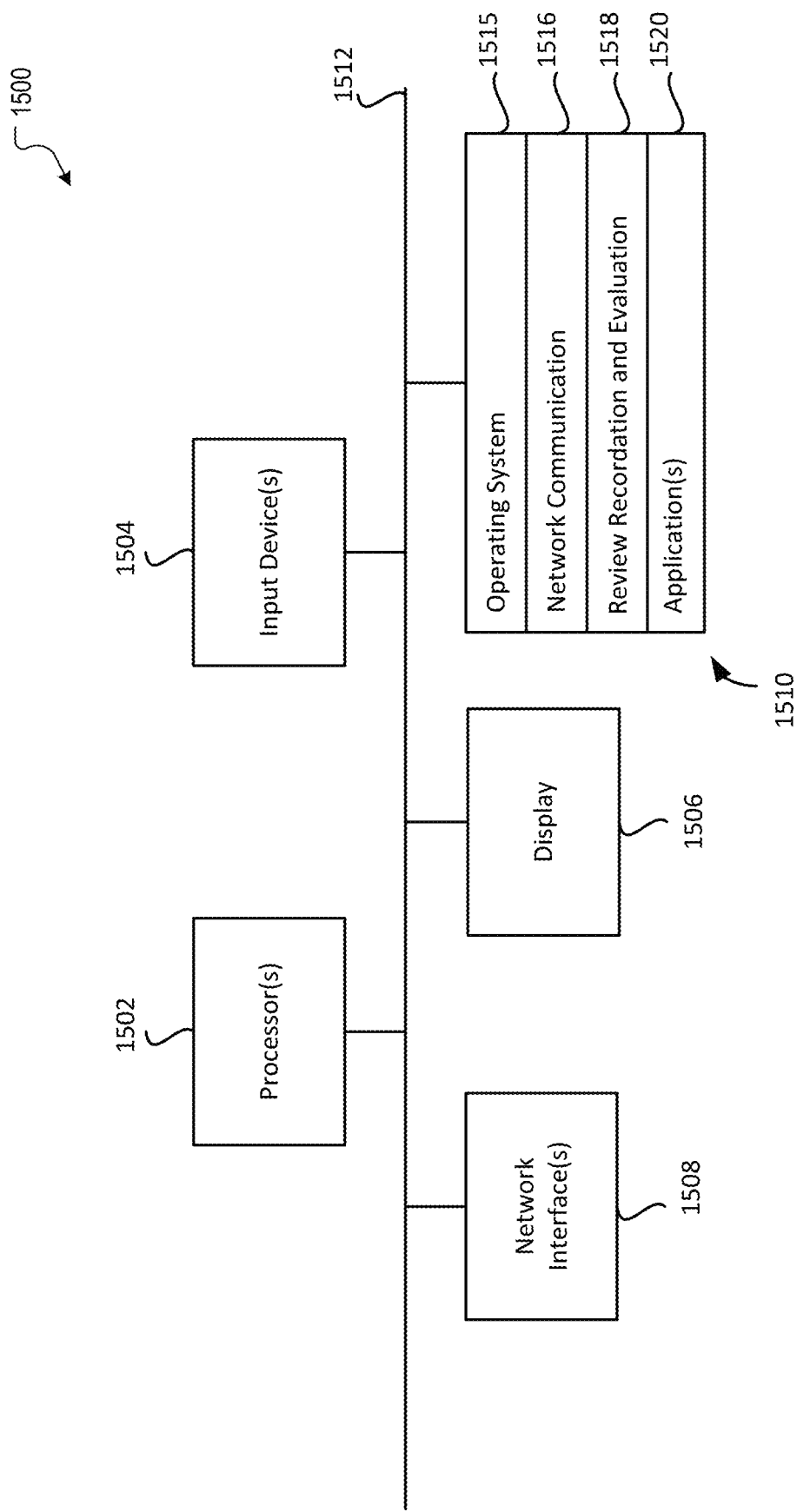
FIG. 15 is a block diagram of an example computing device utilized to execute some embodiments disclosed herein.

FIG. 15 is a block diagram of an example computing device 1500 that may be utilized to execute embodiments to implement processes as described herein. For example, computing device 1500 may be configured to provide the functionality and/or perform the processing described above. Computing device 1500 may be implemented on any electronic device that runs software applications derived from compiled instructions, including without limitation personal computers, servers, smart phones, media players, electronic tablets, game consoles, email devices, etc. In some embodiments, multiple computing devices 1500 may work together to provide the functionality and/or perform the processing described above (e.g., facilitated by one or more network connections). In some implementations, computing device 1500 may include one or more processors 1502, one or more input devices 1504, one or more display devices 1506, one or more network interfaces 1508, and one or more computer-readable mediums 1510. Each of these components may be coupled by bus 1512, and in some embodiments, these components may be distributed among multiple physical locations and coupled by a network.

Display device 1506 may be any known display technology, including but not limited to display devices using Liquid Crystal Display (LCD) or Light Emitting Diode (LED) technology. Processor(s) 1502 may use any known processor technology, including but not limited to graphics processors and multi-core processors. Input device 1504 may be any known input device technology, including but not limited to a keyboard (including a virtual keyboard), mouse, track ball, and touch-sensitive pad or display. Bus 1512 may be any known internal or external bus technology, including but not limited to ISA, EISA, PCI, PCI Express, NuBus, USB, Serial ATA or FireWire. Computer-readable medium 1510 may be any medium that participates in providing instructions to processor(s) 1502 for execution, including without limitation, non-volatile storage media (e.g., optical disks, magnetic disks, flash drives, etc.), or volatile media (e.g., SDRAM, ROM, etc.).

Computer-readable medium 1510 may include various instructions 1514 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 1504; sending output to display device 1506; keeping track of files and directories on computer-readable medium 1510; controlling peripheral devices (e.g., disk drives, printers, etc.) which can be controlled directly or through an I/O controller; and managing traffic on bus 1512. Network communications instructions 1516 may establish and maintain network connections (e.g., software for implementing communication protocols, such as TCP/IP, HTTP, Ethernet, telephony, etc.).

Review recordation and evaluation instructions 1518 may include instructions that enable computing device 1500 to provide functionality and/or perform processing as described herein. Application(s) 1520 may be an application that uses or implements the processes described herein and/or other processes. The processes may also be implemented in operating system 1515.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of generating and displaying an authority score, comprising:
   receiving, by at least one processor, visit data indicative of a user's presence at a location;
   receiving, by the at least one processor, review data describing an entity at the location;
   determining, by the at least one processor, an authority score for the review data, the determining comprising performing a calculation using at least a portion of the visit data as at least one input;
   generating, by the at least one processor, a visual indication of the authority score and the review data, the visual indication having at least one visual characteristic determined by at least one outcome of the calculation, wherein the at least one visual characteristic comprises a first shaded or colored area of a first color indicating at least a portion of the review data and a second shaded or colored area comprising a background layer of the first color and a foreground layer of a second color, and wherein the calculation is configured so that a contrast between the first shaded or colored area and the second shaded or colored area increases, through varying an opacity of the foreground layer, as a function of a degree of increase of the authority score; and
   causing, by the at least one processor, the visual indication to be displayed by a display device.

2. The method of claim 1, wherein the visit data comprises an indication of the location, a duration of the user's presence, a time of the user's presence, a record of a previous visit, an activity performed at the location, an indication of a beacon detection by a client device at the location, or a combination thereof.

3. The method of claim 2, wherein the determining comprises correlating the indication of the location with a record of the location of the entity.

4. The method of claim 2, wherein the determining comprises correlating the beacon detection with a record of the location of the entity.

5. The method of claim 2, wherein the calculation is configured so that the authority score increases with an increase in the duration.

6. The method of claim 2, wherein the calculation is configured so that the authority score decreases with an increase in a difference between a time at which the visit data is received and the time of the user's presence.

7. The method of claim 1, wherein the review data comprises a textual review, a rating score, a media element, or a combination thereof.

8. The method of claim 7, wherein the determining comprises determining a location at which the media element was captured and correlating the location at which the media element was captured with a record of the location of the entity.

9. The method of claim 1, wherein the function of the degree of increase is a linear function.

10. The method of claim 1, wherein the second shaded or colored area comprises a background.

11. A system for generating and displaying an authority score, comprising:
    a display device; and
    at least one processor in communication with the display device and configured to:
    receive visit data indicative of a user's presence at a location;
    receive review data describing an entity at the location;
    determine an authority score for the review data, the determining comprising performing a calculation using at least a portion of the visit data as at least one input;
    generate a visual indication of the authority score and the review data, the visual indication having at least one visual characteristic determined by at least one outcome of the calculation, wherein the at least one visual characteristic comprises a first shaded or colored area of a first color indicating at least a portion of the review data and a second shaded or colored area comprising a background layer of the first color and a foreground layer of a second color, and wherein the calculation is configured so that a contrast between the first shaded or colored area and the second shaded or colored area increases, through varying an opacity of the foreground layer, as a function of a degree of increase of the authority score; and
    cause the visual indication to be displayed by the display device.

12. The system of claim 11, wherein the visit data comprises an indication of the location, a duration of the user's presence, a time of the user's presence, a record of a previous visit, an activity performed at the location, an indication of a beacon detection by a client device at the location, or a combination thereof.

13. The system of claim 12, wherein the determining comprises correlating the indication of the location with a record of the location of the entity.

14. The system of claim 12, wherein the determining comprises correlating the beacon detection with a record of the location of the entity.

15. The system of claim 12, wherein the calculation is configured so that the authority score increases with an increase in the duration.

16. The system of claim 12, wherein the calculation is configured so that the authority score decreases with an increase in a difference between a time at which the visit data is received and the time of the user's presence.

17. The system of claim 11, wherein the review data comprises a textual review, a rating score, a media element, or a combination thereof.

18. The system of claim 17, wherein the determining comprises determining a location at which the media element was captured and correlating the location at which the media element was captured with a record of the location of the entity.

19. The system of claim 11, wherein the function of the degree of increase is a linear function.

20. The system of claim 11, wherein the second shaded or colored area comprises a background.

21. A method of generating and displaying an authority score, comprising:
receiving, by at least one processor, review data describing an entity;
determining, by the at least one processor, an authority score for the review data;
generating, by the at least one processor, a visual indication of the authority score and the review data, the visual indication having at least one visual characteristic corresponding to at least one value of the authority score, wherein the at least one visual characteristic comprises a first shaded or colored area of a first color indicating at least a portion of the review data and a second shaded or colored area comprising a background layer of the first color and a foreground layer of a second color, and wherein the generating comprises increasing a contrast, through varying an opacity of the foreground layer, between the first shaded or colored area and the second shaded or colored area as a function of a degree of increase of the authority score; and
causing, by the at least one processor, the visual indication to be displayed by a display device.

22. The method of claim 21, wherein the review data comprises an indication of a location, a duration of a user's presence at the location, a time of the user's presence at the location, a record of a previous visit, an activity performed at the location, an indication of a beacon detection by a client device at the location, or a combination thereof.

23. The method of claim 22, wherein the determining comprises correlating the indication of the location with a record of the location of the entity.

24. The method of claim 22, wherein the determining comprises correlating the beacon detection with a record of the location of the entity.

25. The method of claim 22, wherein the determining comprises increasing the authority score with an increase in the duration.

26. The method of claim 22, wherein the determining comprises decreasing the authority score with an increase in a difference between a time at which the visit data is received and the time of the user's presence.

27. The method of claim 21, wherein the review data comprises a textual review, a rating score, a media element, or a combination thereof.

28. The method of claim 27, wherein the determining comprises determining a location at which the media element was captured and correlating the location at which the media element was captured with a record of the location of the entity.

29. The method of claim 21, wherein function of the degree of increase is a linear function.

30. The method of claim 21, wherein the second shaded or colored area comprises a background.

31. A system for generating and displaying an authority score, comprising:
a display device; and
at least one processor in communication with the display device and configured to:
receive review data describing an entity;
determine an authority score for the review data;
generate a visual indication of the authority score and the review data, the visual indication having at least one visual characteristic corresponding to at least one value of the authority score, wherein the at least one visual characteristic comprises a first shaded or colored area of a first color indicating at least a portion of the review data and a second shaded or colored area comprising a background layer of the first color and a foreground layer of a second color, and wherein the visual indication is generated by processing comprising increasing a contrast, through varying an opacity of the foreground layer, between the first shaded or colored area and the second shaded or colored area as a function of a degree of increase of the authority score; and
cause the visual indication to be displayed by the display device.

32. The system of claim 31, wherein the review data comprises an indication of a location, a duration of a user's presence at the location, a time of the user's presence at the location, a record of a previous visit, an activity performed at the location, an indication of a beacon detection by a client device at the location, or a combination thereof.

33. The system of claim 32, wherein the determining comprises correlating the indication of the location with a record of the location of the entity.

34. The system of claim 32, wherein the determining comprises correlating the beacon detection with a record of the location of the entity.

35. The system of claim 32, wherein the determining comprises increasing the authority score with an increase in the duration.

36. The system of claim 32, wherein the determining comprises decreasing the authority score with an increase in a difference between a time at which the visit data is received and the time of the user's presence.

37. The system of claim 31, wherein the review data comprises a textual review, a rating score, a media element, or a combination thereof.

38. The system of claim 37, wherein the determining comprises determining a location at which the media element was captured and correlating the location at which the media element was captured with a record of the location of the entity.

39. The system of claim 31, wherein the function of the degree of increase is a linear function.

40. The system of claim 31, wherein the second shaded or colored area comprises a background.

* * * * *